US00RE41185E

(19) United States
(12) Reissued Patent
Gilmore et al.

(10) Patent Number: US RE41,185 E
(45) Date of Reissued Patent: Mar. 30, 2010

(54) ERROR PROOFING SYSTEM FOR PORTABLE TOOLS

(76) Inventors: Curt D. Gilmore, 12520 Margaret Dr., Fenton, MI (US) 48430; Michael L. Ritchey, 9517 Timber Ridge Dr., Grand Blanc, MI (US) 48439

(21) Appl. No.: 11/501,878

(22) Filed: Aug. 9, 2006

Related U.S. Patent Documents

Reissue of:
(64) Patent No.: 6,845,279
Issued: Jan. 18, 2005
Appl. No.: 10/773,349
Filed: Feb. 6, 2004

(51) Int. Cl.
*G06F 19/00* (2006.01)

(52) U.S. Cl. ..... 700/115; 340/426.1

(58) Field of Classification Search ..... 700/108, 700/115–117, 224–226; 340/423.1–224.36, 340/571; 173/2, 176
See application file for complete search history.

(56) References Cited

U.S. PATENT DOCUMENTS 3,792,632 A * 2/1974 Pinkerton
3,963,364 A * 6/1976 Lemelson
3,967,356 A * 7/1976 Holt
3,990,805 A * 11/1976 Ducrohet
4,051,351 A * 9/1977 Mallick, Jr. et al.
4,056,329 A * 11/1977 Perry
4,090,802 A * 5/1978 Bilz
4,425,061 A * 1/1984 Kindl et al.
4,520,446 A * 5/1985 Sato
4,604,559 A * 8/1986 Hawkes et al.
4,615,093 A * 10/1986 Tews et al.
4,636,961 A * 1/1987 Bauer
4,720,907 A * 1/1988 Rapp
4,742,470 A * 5/1988 Juengel
4,778,317 A * 10/1988 Earle, III et al.
4,787,136 A * 11/1988 Majic
4,829,650 A * 5/1989 Galard
4,893,025 A * 1/1990 Lee
4,965,513 A * 10/1990 Haynes et al.
5,012,402 A * 4/1991 Akiyama
5,062,747 A * 11/1991 Chen
5,086,590 A * 2/1992 Athanasiou
5,103,146 A * 4/1992 Hoffman
5,124,622 A * 6/1992 Kawamura et al.
5,125,151 A * 6/1992 Smart
5,150,529 A * 9/1992 Collingwood
5,150,624 A * 9/1992 Kaczmarek et al.
5,243,533 A * 9/1993 Takagi et al.
5,257,199 A * 10/1993 Tsujino et al.
5,349,735 A * 9/1994 Kawase et al.
5,484,026 A * 1/1996 Susaki et al. ..... 173/4
5,675,887 A * 10/1997 Gajewski et al.

(Continued)

FOREIGN PATENT DOCUMENTS

| | | |
|---|---|---|
| DE | 199 61 374 | 6/2001 |
| EP | 1 270 150 | 5/2002 |
| JP | 6-312381 | 11/1994 |

OTHER PUBLICATIONS

Associated Press Article Jul. 13, 2003 "Wal–Mart may use tiny anti–theft radios".*

*Primary Examiner*—Kidest Bahta
(74) *Attorney, Agent, or Firm*—Harness, Dickey & Pierce, P.L.C.

(57) ABSTRACT

A system for controlling and monitoring portable tools at a particular work cell remotely by R-F communication to provide error proofing of various parameters including that the correct tool is to be used at a work cell, the tool is properly calibrated for the operation to be performed, that it is being used a proper number of times per part being assembled or inspected, and that the tool has been calibrated within a selected service interval. The tools will be made actuable only by R-F communication with specific factory apparatus whereby theft of such portable tools will be inhibited.

47 Claims, 11 Drawing Sheets

U.S. PATENT DOCUMENTS 5,675,889 A * 10/1997 Acocella et al.
5,719,559 A * 2/1998 Talbott et al.
5,850,184 A * 12/1998 Bailey et al.
5,874,902 A * 2/1999 Heinrich et al.
5,895,598 A * 4/1999 Kitano et al. ..... 219/619
5,898,379 A 4/1999 Vanbergeijk
5,911,456 A * 6/1999 Tsubouchi et al.
5,918,201 A * 6/1999 Szwast et al. ..... 702/182
6,005,489 A 12/1999 Siegle et al.
6,054,831 A * 4/2000 Moore et al.
6,058,598 A * 5/2000 Dixon et al.
6,119,052 A * 9/2000 Guenther et al. ..... 700/228
6,122,398 A * 9/2000 Yokomae (nee Takano) et al.
6,151,266 A * 11/2000 Henkels et al.
6,211,787 B1 * 4/2001 Yoshiike et al.
6,226,576 B1 * 5/2001 Torno et al.
6,240,613 B1 * 6/2001 O'Connor et al.
6,275,316 B1 * 8/2001 Tischer et al.
6,310,587 B1 * 10/2001 Villino et al.
6,344,817 B1 * 2/2002 Verzulli
6,369,472 B1 * 4/2002 Grimm et al.
6,375,395 B1 * 4/2002 Heintzeman
6,384,560 B1 * 5/2002 Kakino et al.
6,405,598 B1 6/2002 Bareggi
6,411,199 B1 * 6/2002 Geiszler et al.
6,415,875 B1 * 7/2002 Meixner et al.
6,417,780 B1 * 7/2002 Naruke et al.
6,452,496 B1 * 9/2002 Van Horn et al.
6,480,108 B2 * 11/2002 McDonald
6,516,234 B2 * 2/2003 Kamiguchi et al.
6,527,280 B2 * 3/2003 Frauhammer et al.
6,534,942 B2 * 3/2003 Schmidhuber
6,536,100 B2 * 3/2003 Sarh et al.
6,536,780 B2 * 3/2003 Baumann et al.
6,539,603 B1 * 4/2003 Bulow
6,543,121 B2 * 4/2003 Speller, Jr. et al.
6,587,184 B2 * 7/2003 Wursch et al.
6,600,418 B2 * 7/2003 Francis et al. ..... 340/572.1
6,607,041 B2 * 8/2003 Suzuki et al. ..... 173/4
6,622,762 B2 * 9/2003 Bergner et al.
6,628,993 B1 * 9/2003 Bauer
6,629,247 B1 * 9/2003 Hall et al.
6,655,186 B2 * 12/2003 Pfleghar
6,662,882 B2 * 12/2003 Hansson
6,666,283 B2 * 12/2003 Frauhammer et al.
6,732,005 B1 * 5/2004 Bobkin et al. ..... 700/115
6,992,585 B2 * 1/2006 Saleh et al. ..... 340/571
7,065,456 B1 * 6/2006 Butka et al. ..... 702/57
2001/0053949 A1 * 12/2001 Howes et al. ..... 700/237
2002/0029452 A1 * 3/2002 Cappa et al.
2002/0144832 A1 * 10/2002 Brandstrom et al.
2003/0017821 A1 * 1/2003 Irvin ..... 455/410
2003/0037423 A1 * 2/2003 Siegel
2003/0101578 A1 * 6/2003 Moriya et al.
2003/0102970 A1 * 6/2003 Creel et al. ..... 340/568.1
2003/0105599 A1 6/2003 Fisher et al.
2004/0098157 A1 * 5/2004 Sabini et al. ..... 700/115
2004/0182175 A1 * 9/2004 Day et al. ..... 73/862.21
2007/0034394 A1 * 2/2007 Gass et al. ..... 173/2
2007/0090948 A1 * 4/2007 Sobol ..... 340/541

* cited by examiner

ERROR PROOFING SYSTEM FOR PORTABLE TOOLS

Matter enclosed in heavy brackets [ ] appears in the original patent but forms no part of this reissue specification; matter printed in italics indicates the additions made by reissue.

*This is a reissue of U.S. Pat. No. 6,845,279 issued Jan. 18, 2005. A further reissue divisional application has been filed, namely application Ser. No. 11/650,408 issued Jan. 18, 2005 and which claims the benefit under 35 U.S.C. §120 of the present reissue application (applicant Ser. No. 11/501, 878).*

FIELD OF THE INVENTION

The present invention relates to a system created to add assembly line error proofing and anti-theft features to existing portable tools. This invention greatly enhances the capabilities of a wide variety of tool types, but, for purposes of simplicity, the tool type exemplified in the body of this document shall be, by way of example, those used for installing threaded fasteners in assembling workpieces together.

BACKGROUND OF THE INVENTION

Many assembly lines require some way to determine that the tools being used to perform assembly or operations requiring various parameters including predetermined magnitudes of torque, force, pressure, etc. at a particular work cell and are the correct make and model that have been properly set up, configured, calibrated and maintained. They then may require further error proofing to assure that the operations have been correctly performed by the technicians with the pre-approved tool that is used the proper number of times per part being assembled or inspected. They may also require, over time, a constant verification that the tools have been properly maintained, calibrated, and/or certified per a documented procedure or company quality policy. For example, a quality policy can place requirements for tool maintenance and recalibration to be based on the number of times the tool is used (cycle count) and/or by elapsed time between maintenance and recalibration. In traditional applications some such error proofing has been done by non-portable tools which are directly connected by hard wired cables or hoses with hard wired cables to a work cell controller whereby they can derive electric, pneumatic or hydraulic power through these cables or hoses and various ones of those parameters noted being monitored via the hard wired cables. However, this cannot be done with portable tools such as battery operated tools or tools electrically operated by a simple cord connection to an electrical outlet. The present invention provides a system for controlling and monitoring portable tools at a particular work cell by remote communication to prevent them from being used it they are not configured properly, not calibrated properly, not the specified tool for this work cell, have an unacceptably high amount of use without being calibrated or serviced and have some other unacceptable feature being monitored. The present invention further provides a means to disable a tool such that it cannot be actuated when not in the presence of operatively related equipment at the assembly factory thereby establishing anti-theft initiatives.

SUMMARY OF THE INVENTION

The present invention provides a system to enhance the use of tools that today have no way to provide substantial forms of error-proofing other than manual assurance.

Through the addition of some intelligent electronics in the tool and a supervisory computer at the work cell, this invention provides a means for providing error-proofing operation and anti-theft capabilities. In addition, the present invention provides means for providing other capabilities to be included in a variety of equipment to facilitate monitoring the tools. Making some of the memory inside the tool available to the end user shall allow the end user to include select ed information to be part of the data transferred between the portable tool and the work cell controller that the end user deems pertinent for whatever additional information exchange needed to fulfill any additional tests, qualifications, or information exchange desired. This system and equipment enhances portable battery, electrical cord, hydraulic or compressed air powered tools to pro vide the requirements for them to be used in an error-proofed assembly line. In this regard, the system and equipment, for example, can assure that the correct tool make, model number, and configuration is to be used at a work cell, that the tool being used is properly calibrated to a preselected target value, that it is being cycled the proper number of times per part being assembled, and that the tool has been serviced or calibrated within required service intervals. Here such portable tools will be monitored and controlled remotely by R-F (radio frequency) communication and without the need for hard wire cable connections for such monitoring and control.

It should be understood, and as noted above, that a portable, non-battery electric tool can be utilized which is powered by an electric power source at the work cell whereby only a typical, simple electric cord need to be provided for electrical connection. Thus such tools would not have a hard wire cable connection for communication as noted but could be monitored and controlled remotely by R-F communication. In addition, a portable tool could be monitored by simply having a battery operated, transceiver with data for tracking and monitoring by R-F communication. It should also be understood that pneumatic or hydraulic powered tools powered by hoses can be adapted to provide monitoring at the work cell by R-F communication and without the need for hard wire cable or other type of fixed wire transmission connection for monitoring. This could also facilitate maneuverability of the tool by the operator.

Therefore it is an object of the present invention to provide an error proofing system for utilizing tools at work cells with the tools being controlled and monitored remotely without the need for hard wire cable connections.

It is another object of the present invention to provide a system for utilizing portable, self-powered tools at work cells with the tools being controlled and monitored remotely for error proofing without the need for hard wire cable connections.

It is another object of the present invention to provide a system for utilizing portable, self-powered battery or manually actuated tools at work cells with the tools being controlled and monitored remotely by radio frequency (R-F) communication for error proofing and without the need for hard wire cable connections.

It is another object of the present invention to provide a system for utilizing portable, self-powered battery or manually actuated installation tools at work cells with the installation tools being remotely monitored and controlled for error proofing by radio frequency (R-F) communication and without the need for hard wire cable connections.

It is another object of the present invention to provide a system for utilizing portable, self-powered battery, electrically powered by electric cord, or manually actuated tools at work cells with the tools being remotely monitored and/or controlled for error proofing by radio frequency (R-F) communication and without the need for hard wire cable connections.

It is still another object of the present invention to provide a system for utilizing pneumatically or hydraulically actuated tools being remotely monitored and/or controlled for error proofing by R-F communication without the need for hard wire cable connections.

Further areas of applicability of the present invention will become apparent from the detailed description provided hereinafter. It should be understood that the detailed description and specific examples, while indicating the preferred embodiment of the invention with numerous specific features, are intended for purposes of illustration only and are not intended to limit the scope of the invention nor its applicability of various combinations of specific features to other applications.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The system has a number of different interacting components. These are generally shown in block diagram form in FIGS. 1–7.

Figure 1:
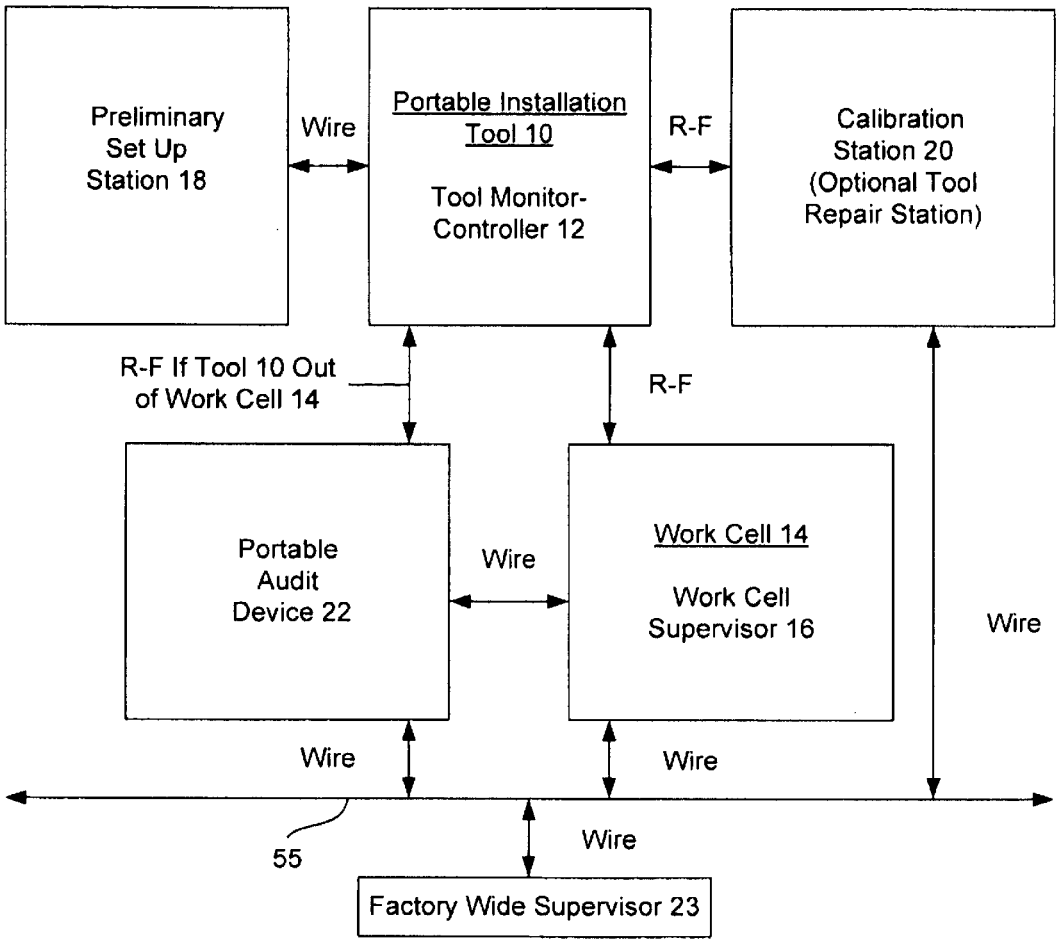
FIG. 1 is a block diagram illustrating one form of the system of the present invention for error proof monitoring of a portable installation tool being used to install threaded fasteners including a tool monitor-controller located within the portable installation tool, a work cell supervisor located at a particular work cell at which the tool is to be used, a preliminary set-up station typically at the facility that subsequently installs the monitoring and control electronics on the base tool and at which certain information relating to the tool is initially fed into the tool monitor-controller, a calibration station at the assembly factory at which the torque to be applied by the tool in setting a fastener at the assembly factory is set and recorded in the tool monitor-controller, and a portable audit device at the assembly factory by which an operator can audit certain information on portable tools located at various work cells and other locations; it also shows the system in relation to a factory wide supervisor at the assembly factory.
Figure 2:
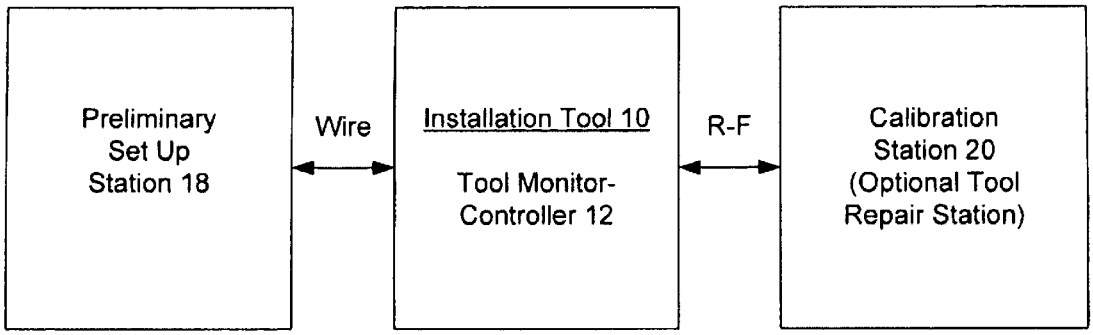
FIG. 2 is a block diagram showing a portion of the system in which the tool monitor-controller is operable with the preliminary set up station at the facility that installs the monitoring and control electronics and the calibration station at the assembly factory.

Looking now to FIG. 1, the portable self-powered installation tool 10 is provided with a tool monitor-controller 12, which, as will be seen, provides the necessary information for monitoring the tool 10 for the desired error-proofing operation. In this regard FIG. 1, generally shows the interconnection between the installation tool 10 and various components of the system which include a work cell supervisor (WCS) 16 at a particular work cell 14, a preliminary set up station 18, a calibration station 20 and a portable audit device 22 (PAD). In one form of the system, the work cell supervisor 16 and portable audit device 22 can be connected to a factory wide supervisor 23 for purposes to be seen.

The installation tool 10 can be set to be used at a particular work cell 14 to install fasteners to secure workpieces together. The operation of the tool 10 is remotely monitored and controlled at the work cell 14 by the work cell supervisor 16 in a manner to be seen. In this regard, as seen in FIG. 1, the remote communication between the tool monitor-controller 12 and work cell supervisor 16 is by radio frequency (R-F).

However, prior to locating the tool 10 in the work cell 14 at the assembly factory, it is first located at a preliminary set up station 18. See FIGS. 2 and 5 Here, as will be seen, basic information about the tool 10 will be placed into the tool monitor-controller 12 by a set up PC 34 at the preliminary set up station 18 which is typically done at the location where the electronics are added to the base tool after completion of its manufacture. This could be at the facility which manufactured the base tool or at some other facility. It should be understood that the designation PC refers to a "personal computer" and/or a "portable computer". As will be seen certain of the information initially put into the tool monitor-controller 12 by the preliminary set up station 18 will not be permitted to be changed by the end user at the assembly factory but certain other information will be permitted to be modified, updated or initially placed therein.

Next, at the assembly factory site of the end user the portable installation tool 10 must be calibrated to provide the desired magnitude of torque for its use to install fasteners at a particular work cell 14. In this regard, as will be seen, the tool 10 typically will have the capability to provide torque over a significant range of magnitudes for the same or different applications at work cells 14. In this regard, by way of example, the portable installation tool 10 can be a torque type tool for installing threaded fasteners and of a type such as a nut runner for securing a nut to a bolt at a particular torque or a screw driver for installing a threaded bolt or screw at a particular torque.

At the calibration station 20 the torque magnitude of the tool 10 will be set by a technician to the desired level for a particular operation at a particular work cell 14. The adjustment of the tool 10 by the service technician will be monitored and measured by the calibration station 20. See FIGS. 2 and 6. Once the proper magnitude has been set and verified, the calibration station 20 will then transmit that calibration information via an R-F link to a tool memory 30 in the tool monitor-controller 12 in the installation tool 10 for later monitoring by the work cell supervisor 16. As will be seen, in one form of the invention the tool memory 30 is a flash memory which is a part of a tool transceiver to be described. See FIG. 6. Here, the calibration station 20 will be routinely at a location remote from the work cell 14. The calibration station 20 preferably will use commercially available calibration devices that are certified to the appropriate national or international standards requirements (i.e. National Bureau of Standards).

The present system also provides a portable audit device (PAD) 22 which can be carried by a roving quality inspector or tool repair technician and used to audit various information in the tool monitor-controller 12. See FIGS. 1 and 3. This can be done at the work cell 14 without interruption to normal assembly operations by the PAD 22 communicating via a hard line directly to the work cell supervisor 16 without disrupting the R-F based communications between the tool 10 and the work cell supervisor 16. It is possible for the PAD 22 to communicate directly to the tool monitor-controller 12 of the tool 10 via an R-F link where the PAD 22 is built from a device that can support the R-F link directly, and an R-F linkage is not operational at that time between the work cell supervisor 16 and the tool monitor-controller 12. In this regard, the tool monitor-controller 12 will not permit R-F communication with the PAD 22 if the tool monitor-controller 12 is in R-F communication with the work cell supervisor 16. The PAD 22 can be manufactured from a number of portable computing devices similar to ones such as a laptop computer, personal digital assistant, or a custom embedded controller based system specially designed by one skilled in the art. It should be understood, that the PAD 22 is not critical to the overall system but in one form of the invention can be provided at the assembly factory for separate, selective auditing.

Figure 8:
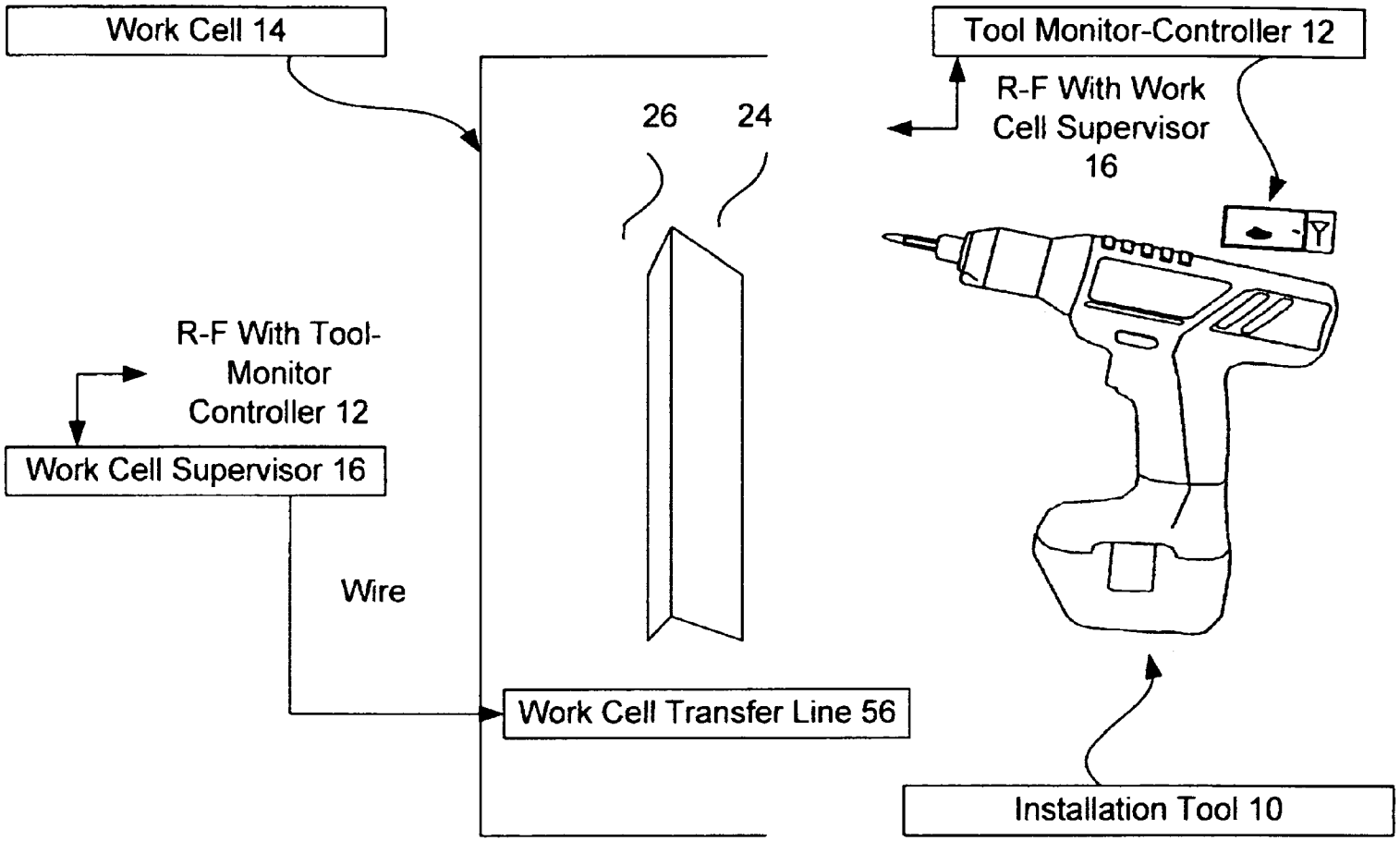
FIG. 8 is a general pictorial diagram depicting a specific form of a portable, self-powered fastening tool with a tool monitor-controller at a work cell the operation of which is being monitored by a work cell supervisor.

Looking now to FIG. 8, a typical portable, self-powered tool 10 is generally shown at a work cell 14 in preparation for fastening together a pair of workpieces 24 and 26. In order to be sure that the tool 10 is the correct one for properly installing the particular type of fasteners, it is provided with numerous items of data accessible by the work cell supervisor 16 located at that work cell 14.

In this regard the tool monitor-controller 12 in the tool 10 is provided with significant information and data which is stored and includes the information critical to being actuated for operation at the work cell 14. This information is made available for monitoring by the work cell supervisor 16. Thus in one form of the invention the tool monitor-controller 12 can be provided with a tool memory 30 in which the information and data, items 1–24, (listed below) are stored. This list in no way limits the capabilities nor intent of this invention and is intended to be only an exemplary list of parameters that can be selectively revised or updated and further enhanced with software component modifications.

It should be understood, that most or all of the items 1–24 may be initially programmed into the tool memory 30 by the preliminary set up station 18 at the facility where the electronics is installed. Each item will have its own identifiable memory location. However, the end user can be provided with similar apparatus with a limited set up and revision software. In one form, this type of software would be located at the calibration station 20 and allow the service technician access to certain parameters using a special password access and to other parameters not requiring a special password.

The following is an exemplary list of parameters:

The following is an exemplary list of parameters:

1. Tool Type—This is typically defined as a coded type plus manufacturer code. Tool Type could be one for Fastening, various Dimensional checking, Pressure checking, Force measurement and the like. A specific example of this code would be FB for Fastening, Bosch, a tool made by Bosch Tool Corporation, for fastening threaded fasteners. This is set by the preliminary set up station 18 at the facility where the electronics are installed and is not field changeable.

2. Tool Model Number—This is entered to reflect the tool manufacturer's model number in the format routinely displayed on the outer markings of the tool. This is set by the preliminary set up station 18 where the electronics are initially installed or can be changed in the field by selected, certified technicians using password protected features of the calibration station 20 when a change has been made to the mechanics of the tool that alter its applicability to a particular work cell or alter the fundamental operation of a tool (new gear ratio, addition of special end effectors, etc.)

3. Tool Serial Number—This is entered to reflect the tool manufacturer's serial number routinely displayed in the format seen on the outer markings of the tool. This is set by the preliminary set up station 18 at the facility where the electronics are installed and is not field or end user changeable.

4. Tool Build Date—This is the date that the electronics with R-F link enhancements for providing error proofing were installed in the base tool but is not the date the base tool was manufactured. This is set by the preliminary set up station 18 where the electronics is initially installed and is not field changeable.

5. PCB Serial Number (printed circuit board)— This is the serial number of the printed circuit board used to build the tool monitor-controller 12. This is set by the preliminary set up station 18 at the facility where the electronics is initially installed or can be changed in the field by selected, certified technicians using the password protected features of the calibration station 20 when the module with a tool monitor-controller 12 is replaced.

6. PCB Revision (printed circuit board)— This is the revision date of the printed circuit board used to build the tool monitor-controller 12. This is set by the preliminary set up station 18 at the facility where the electronics was installed or can be changed in the field at the assembly factory by selected certified technicians using the password protected features of the calibration station 20 when a tool monitor-controller 12 is replaced.

7. Tool Monitor-Controller Software Revision—This reflects the revision of the software programmed into the memory 30 of the tool monitor-controller 12. This can be set by the preliminary set up station 18 at the facility where the electronics was installed or changed in the field by selected, certified technicians using the password protected features of the calibration station 20 when the software in the tool monitor-controller 12 is reprogrammed or replaced.

8. Total Tool Cycle Count—As a tool 10 is used and executes "good" cycles the tool monitor-controller 12 reports good cycle information to the work cell supervisor 16. For a torque tool, a "good" cycle is when the desired magnitude of installation torque is attained in setting a fastener. Because in some forms of the invention the amount of programming space is highly limited in the tool monitor-controller 12 and in the memory 30, the software to keep track of the number of cycles a tool 10 has been run is executed in the work cell supervisor 16. Because, in some instances, it is the nature of the tool memory 30 to be limited in the number of times it can be successfully written into, in one case, the total tool cycle count is incremented only after 100 good cycles have been run. After 100 good cycles have been performed, the work cell supervisor 16 writes a new (incremented by 100) total cycle count into the memory 30 on the tool monitor-controller 12. This count is set at zero by the preliminary set up station 18 at the facility where the electronics is initially installed and automatically incremented after each 100 cycles through the normal operation and interaction of the tool monitor-controller 12 and the work cell supervisor 16. This 100 cycle count cannot be reset at the customer site and can only be changed at the facility where the electronics was installed.

9. Cycle Count At Last Service Interval—This is set initially at zero by the preliminary set up station 18 when the electronics is initially installed and is automatically reset using the calibration station 20 when a tool is serviced and recalibrated by certified technicians. When a tool is serviced, the calibration station 20 will read the total tool cycle count and copy its present value into the cycle count at last service interval automatically. It will also revise the 15. Date of Last Calibration to "today's" date.

10. Service Interval Cycles—This sets the maximum number of cycles allowed to be run on a tool between service intervals. This is initially set at an appropriate number, i.e. for example 100,000 cycles, by the preliminary set up station 18. This can then be reset by the calibration station 20. A tool is shut down by the work cell supervisor 16 if the total tool cycle count is greater than or equal to the tool's cycle count at last service interval plus the pre-set service interval cycles. In one form of the invention, an alarm output will be generated by the work cell supervisor 16 if the total tool cycle count is greater than or equal to the tool's cycle count at last service interval plus 80% of the pre-set service interval cycles. This creates an alarm at 80% of the service interval to assure plenty of time to re-certify the tool or provide a replacement tool to avoid or minimize assembly line down time. The facility where the electronics is installed will place this default value into the parameter via the preliminary set up station 18, but the service technician can change it at any time through the calibration station software 40 at the calibration station 20.

11. Date Of Last Service—This is automatically entered by the calibration station 20 when a tool is re-calibrated after servicing. It will also revise 9. Cycle Count at Last Service, 13. Cycle Count At Last Calibration, and 15. Date of Last Calibration.

12. Service Interval Days—This sets the maximum number of calendar days a tool is allowed to be run between servicing and is originally set at the preliminary set up station 18 at an appropriate number, for example 100 days. A tool is shut down by the work cell supervisor 16 if the present date is greater than or equal to the tool's date of last service plus the pre-set service interval days. In one form of the invention an alarm output will be generated by the work cell supervisor 16 if the present date is greater than or equal to the tool's date of last service plus 80% of the pre-set service interval days. This creates an alarm at 80% of the pre-set service interval days to assure plenty of time to re-certify the tool or provide a replacement tool to avoid or minimize assembly line down time. The preliminary set up station 18 will initially place this default value into this parameter, but the service technician can change this default number at any time through the calibration station software 40.

13. Cycle Count At Last Calibration—This is set at zero at the facility where the electronics is installed and automatically set when a tool is calibrated by certified technicians using the calibration station 20. When a tool is calibrated, the calibration station 20 will read the total tool cycle count and record its present value into the cycle count at last calibration automatically. It will also reset 15. Date of Last Calibration.

14. Calibration Interval Cycles—This sets the maximum number of cycles a tool is allowed to be run between calibrations. A tool is shut down by the work cell supervisor 16 if the total cycle count is greater than or equal to the tool's cycle count at last calibration plus the pre-set calibration interval cycles. In one form of the invention, an alarm output will be generated by the work cell supervisor 16 if the tool cycle count is greater than or equal to the cycle count at last calibration plus 80% of the pre-set calibration interval cycles. This creates an alarm at 80% of the allowable cycle counts between calibrations to assure plenty of time to re-certify the tool or provide a replacement tool to avoid or minimize assembly line down time. The facility where the electronics is installed will initially place a default value into this parameter by the preliminary set up station 18, but the service technician can change it at any time through the calibration station software 40.

15. Date Of Last Calibration—This is set at the facility where the electronics is installed by the preliminary set up station 18 to the tool build date and automatically reset at the assembly factory when a tool is calibrated by certified technicians using the calibration station 20.

16. Calibration Interval Days—This sets the maximum number of calendar days a tool is allowed to be run between calibrations. A tool is shut down by the work cell supervisor 16, which determines the elapsed days, if the present date is greater than or equal to the tool's date of last calibration plus the pre-set calibration interval days. In one form of the invention an alarm output will be generated by the work cell supervisor 16 if the present date is greater than or equal to the tool's date of last calibration plus 80% of the pre-set calibration interval days. This creates an alarm at 80% of the pre-set calibration interval days to assure plenty of time to re-certify the tool or provide a replacement tool to avoid or minimize assembly line down time. The facility where the electronics is installed will initially place a default value into this parameter, but the service technician can change it at any time through the calibration station software 40.

17. Customer Field 1— This memory location is open for customer use. These data fields are set at the facility where the electronics is installed to null characters by the preliminary set up station 18, but the customer can insert information or change them at the assembly factory by using the calibration station 20.

18. Customer Field 2— see Customer Field 1.

19. Customer Field 3— see Customer Field 1.

20. Tool Maximum Capacity (torque, dimension, pressure, force, etc) in engineering units. This is set at facility where the electronics is installed by the preliminary set up station 18 or changed in the field at the assembly factory by certified technicians using the password protected features of the calibration station 20 when a change has been made to the mechanics of the tool that alter its applicability to a particular work cell 14 or alter the fundamental operation of a tool (new gear ratio, addition of special end effectors, etc.).

21. Engineering Units (Lb-Ft, Inches, PSI, Lbs, Etc.) This is set at the facility where the electronics is installed by the preliminary set up station 18 or changed in the field at the assembly factory by certified technicians using the calibration station 20 and the calibration station software 40.

22. Tool Minimum (Torque, Dimension, Pressure, Force, Etc.) This is set the facility where the electronics is installed by the preliminary set up station 18 or changed in the field at the assembly factory by certified technicians using the password protected features of the calibration station 20 when a change has been made to the mechanics of the tool that alter its applicability to a particular work cell or alter the fundamental operation of a tool (new gear ratio, addition of special end effectors, etc.).

23. Spare—This is an open information site in the tool memory 30 accessible by the calibration station 20 at the assembly factory to put in whatever information the end user desires monitoring, such as other rebuild dates, etc.; it should be understood that a number of other open memory locations could be provided for selected use by the end user.

24. Tool Setting (torque, dimension, pressure, force, etc.). This is generated by the calibration station 20 and is typically the calculated average of 10 cycles. This is set at the facility where the electronics is installed by the preliminary set up station 18 or changed in the field at the assembly factory by technicians using the calibration station 20 when an adjustment has been made to the average capability of the tool (e.g. adjustment to the torque clutch, etc.). The service technician can change it at any time through the calibration station software 40.

The following chart provides a brief summary of the list of items 1–24 discussed above.

Values And Data Entered into the Tool Memory 30 by the Preliminary Set-up Station 18 When Shipped to the Customer

| Item | Parameter Name | Value Set Into the Tool Memory 30 When Shipped |
|---|---|---|
| *1 | Tool Type | Coded Tool Type plus Manufacturer's Code |
| 2 | Tool Model Number | Model number of base tool as it appears on the tool |
| *3 | Tool Serial Number | Serial number of base tool as it appears on the tool |
| *4 | Tool Build Date | The date the tool had the electronics installed. Useful for warranty liability |
| 5 | PCB Serial Number (printed circuit board) | The serial number of the Tool Monitor-Controller 12 printed circuit board |

-continued

Values And Data Entered into the Tool Memory 30 by the Preliminary Set-up Station 18 When Shipped to the Customer

| Item | Parameter Name | Value Set Into the Tool Memory 30 When Shipped |
|---|---|---|
| 6 | PCB Revision (printed circuit board) | The revision number of the Tool Monitor-Controller 12 printed circuit board |
| 7 | Tool Monitor-Controller Software revision | The revision number of the Tool Monitor Controller software installed |
| *8 | Total Tool Cycle Count | Zero |
| 9 | Cycle Count At Last Service Interval | Zero |
| 10 | Service Interval Cycles | 100,000 |
| 11 | Date Of Last Service | The date the tool had the electronics installed |
| 12 | Service Interval Days | 100 |
| 13 | Cycle Count At Last Calibration | Zero |
| 14 | Calibration Interval Cycles | 10,000 |
| 15 | Date Of Last Calibration | The date the tool had the electronics installed |
| 16 | Calibration Interval Days | 1 |
| 17 | Customer Field 1 | Blank |
| 18 | Customer Field 2 | Blank |
| 19 | Customer Field 3 | Blank |
| 20 | Tool Max. Capacity (torque, dimension, pressure, force, etc | Per Manufacturer's Specification |
| 21 | Engineering Units (Lb-Ft, inches, PSI, Lbs, etc.) | Tool Specific |
| 22 | Tool Minimum (torque, dimension, pressure, force, etc). | Per Manufacturer's Specification |
| 23 | Spare | Blank |
| 24 | Tool Setting (torque, dimension, pressure, force, etc). | 20% of Tool Maximum Capacity |

*Identifies those parameters that are settable only by the Preliminary Set-up Station 18.

It should be noted that the data listed for certain of the monitoring parameters can be changed at the discretion of the end user, for example such as 10. Service Interval Cycles, 12. Service Interval Days, 14. Calibration Interval Cycles and 16. Calibration Interval Days.

The Customer Fields 1–3 permit the end user at the assembly factory to put any type of information desired into the tool memory 30. For example, they could use it to specify what section or work cell of an assembly factory the tool 10 is allowed to be used at, the number of times the tool 10 had to be serviced during its life, the owners asset number, where the tool 10 was bought, etc. This information will be available at each work cell 14 to allow the end user to write software to perform any type of test, data logging, or asset (tool) tracking program they wish.

Thus the work cell supervisor 16 can then view or monitor all of the above items stored in the tool memory 30. The work cell supervisor 16 will be programmed to select from this data listed to qualify a particular tool as allowed to operate. In addition, since the work cell supervisor 16 is linked to the factory wide supervisor 23 all of the data stored in the tools being used at work cells 14 in the assembly factory can be made available to the factory wide supervisor 23. Thus, through this link, supervisory or maintenance people can perform an audit on the condition and location of all the portable tools located and active within this network. The embodiments of this specification only provide, by way of example, the mechanisms for making certain, selected data available to the factory wide supervisor 23 and makes no attempt at defining the other numerous ways that this data could be modified and could be accessed and used.

As noted the installation tool 10 can be one of generally standard design such as a portable, battery operated torque tool. Here, in order to correctly monitor the magnitude of torque as applied to a fastener, the tool 10 will have a (torque) measurement sensor 60. In this regard the magnitude of torque could be sensed by a torque transducer built into the tool and monitored to determine the magnitude of torque applied to each fastener. On the other hand some torque tools are provided with a mechanical sensor having a clutch which is adapted to be moved such that when the preset magnitude of torque is attained it will be moved sufficiently to open a switch whereby rotation of the motor is stopped. One such tool is manufactured by Bosch Tool Corporation[1]. The clutch includes a shut-off ring connected to a micro-switch, and a clutch spring and tension adjuster assembly. The clutch spring exerts a resilient bias against the shut-off ring. As torque on the fastener increases, the shut-off ring is moved against that resilient bias. When the tool reaches the pre-set magnitude of torque, the shut-off ring is moved against the bias of the clutch spring to a position opening the micro-switch whereby rotation of the motor is stopped. The magnitude of shut-off torque can be selectively set by adjustment of the tension adjuster which is accessible to the service technician equipped with any special tooling necessary to change the amount of resilient bias needed to be overcome to open the micro-switch. Now the condition of the micro-switch is sensed and provides the signal of correct magnitude of applied torque when it is opened.

[1] BOSCH® is the registered trademark of Robert Bosch GmbH.

The specific details of such tools with torque transducers as sensors or with torque responsive clutches are known in the art and do not constitute a part of the present invention and thus have been omitted for simplicity and brevity. For example, the use of a torque limiting clutch for limiting the torque to selected magnitudes and to act as a switch is noted in U.S. Pat. No. 6,662,882 issued Dec. 16, 2003 to Hanson for Power Nut Runner With Torque Responsive Power Shut Off and U.S. Pat. No. 3,792,632 issued Feb. 19, 1974 to Pinkerton for Tool For Torquing And Crimping Fasteners.

Figure 4:
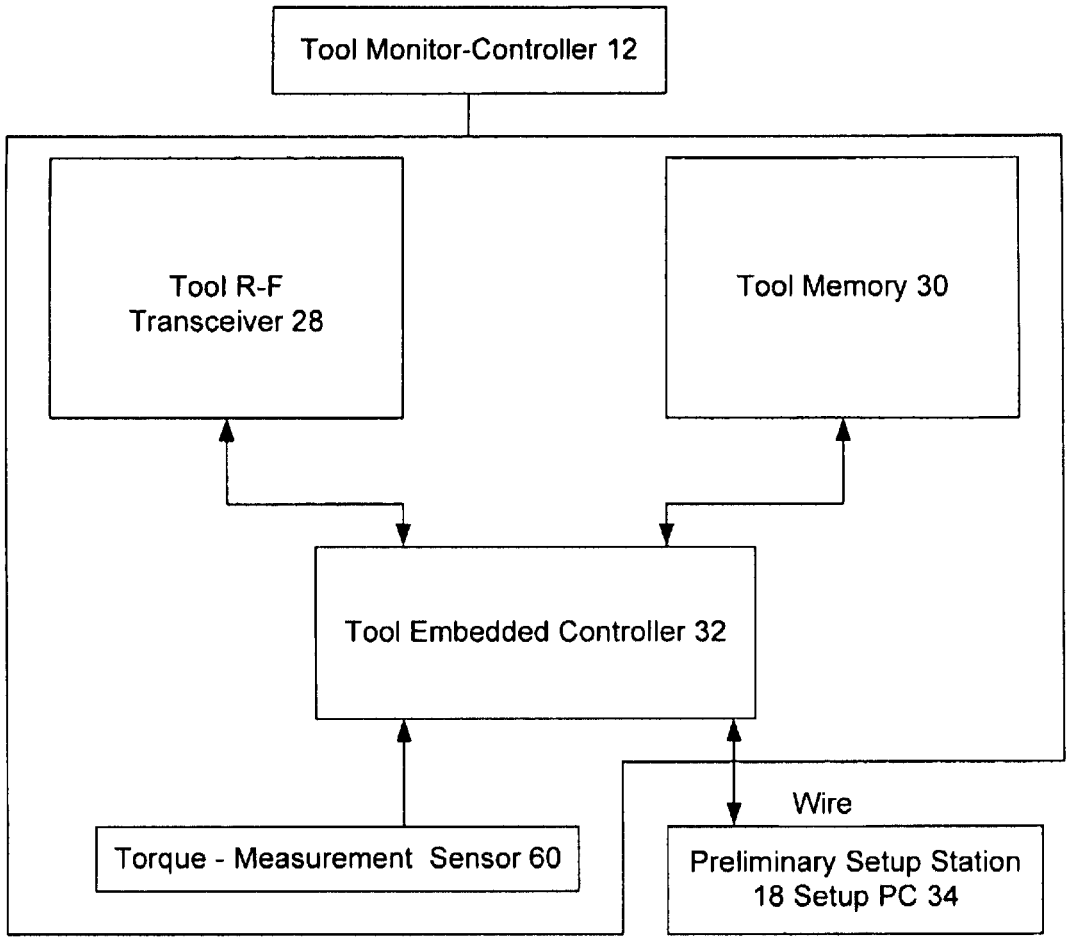
FIG. 4 is a block diagram of various components of the tool monitor-controller and as operable with the preliminary set up station.
Figure 5:
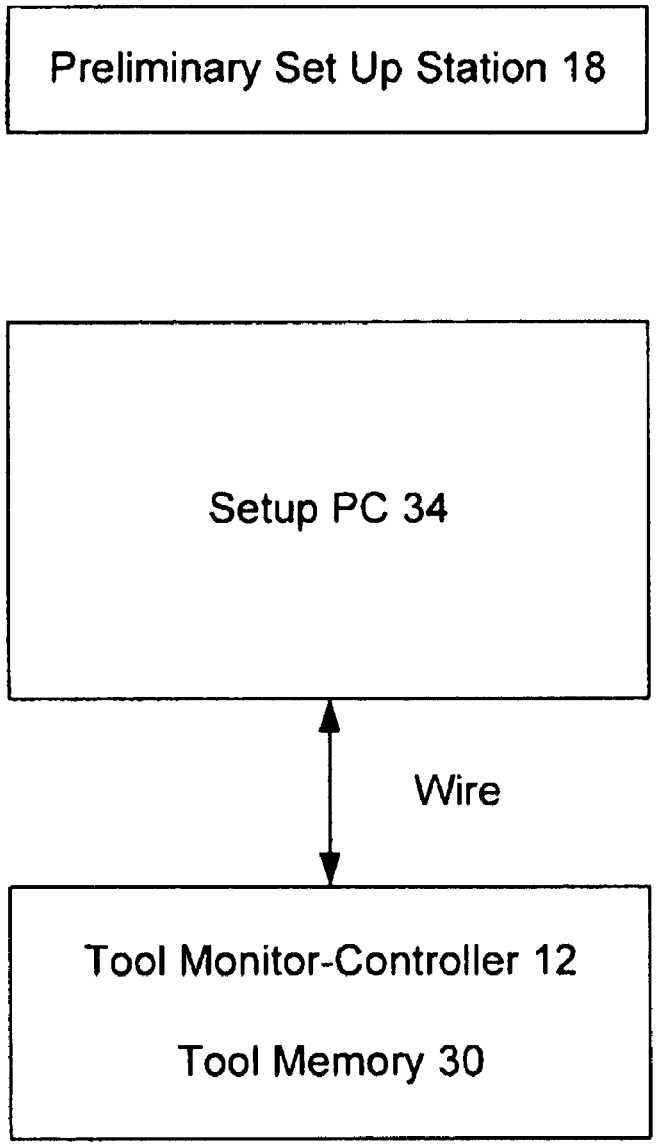
FIG. 5 is a block diagram of a component of the preliminary set up station as operable with a component of the tool monitor-controller.

As noted the portable installation tool 10 has the tool monitor-controller 12 located therein. The various components of the tool monitor-controller 12 are shown in FIG. 4. There it can be seen that the monitor-controller 12 has a tool embedded controller 32 which is actuable to control the operation of the tool 10.

The tool embedded controller 32 receives the signal from the (torque) measurement sensor 60 each time a fastener is set at the preselected magnitude of torque. The embedded controller 32 is also connected to the tool memory 30 and has access to the information stored therein. The tool monitor-controller 12 has a tool R-F transceiver 28 by which the tool 10 can communicate wirelessly by radio frequency with the work cell supervisor 16, the calibration station 20 and the portable audit device 22. See FIG. 1.

Since, for this particular example of implementation, the R-F link is typified as a Bluetooth™ R-F link, the tool memory 30 can be attained by using a 4 Mbit Flash memory similar to an SST39VF4 or equivalent, and use the Persistent Store User Definable Data values as defined by Cambridge Silicon Radio re the CSR chip and Bluetooth™ protocol (commercially available) as a transport mechanism to get the data from the tool memory 30 to become available at the work cell supervisor 16. The use of the Bluetooth™ protocol is the protocol used for this example. Bluetooth R-F modules and transceivers are commonly used and are commercially available. But it should be understood that other commercially available R-F transceivers and modules are commonly used. For example alternatives to Bluetooth™ such as 802.11, WiFi, or Zigbee could be used to perform the same R-F function as that described herein. Therefore, the tool R-F transceiver 28 can be selected from a number of commercially available ones.

As noted, before the portable installation tool 10 is used it is first programmed at the preliminary set up station 18 at the facility where the electronics is installed, then calibrated at the assembly factory at the customer site by the calibration station 20.

Thus the installation tool 10 is taken to the calibration station 20 for setting the tool 10 to provide the desired magnitude of torque. See FIG. 6.

Figure 6:
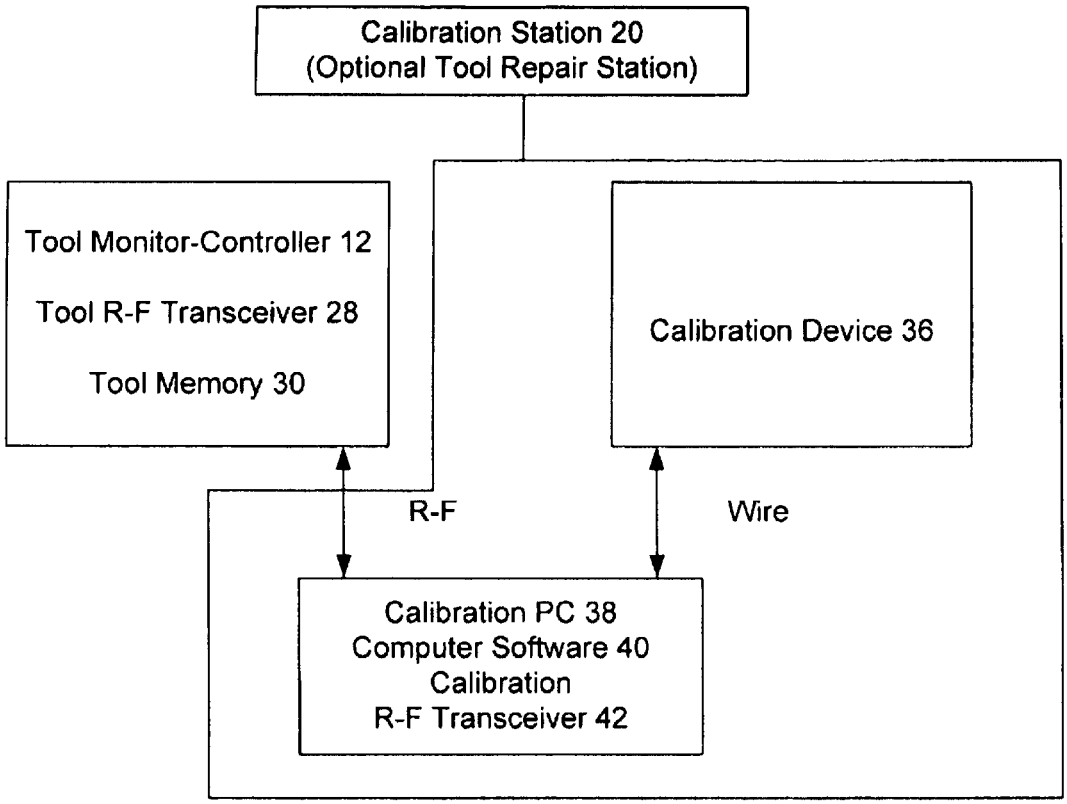
FIG. 6 is a block diagram of components of the calibration station and as operable with the tool monitor-controller.

Looking now to FIG. 6, the calibration station 20 includes a calibration device 36, a calibration PC 38 with computer software 40, and a calibration R-F transceiver 42.

When the tool 10 is being calibrated there are two paths for communication into and out of the calibration PC 38. The calibration PC 38 uses the first bi-directional link to drive the R-F link to the tool monitor-controller 12 via the calibration R-F transceiver 42 and the tool R-F transceiver 28. The implementation of these communication ports could be done in many ways, but in one form will mainly be configured as a plug-in card for a PC (PCMCIA, Compact Flash, etc), or a custom design for a single board computer design. The calibration PC 38 has a second (cabled) serial link to the calibration device 36. When the tool 10 is brought into proximity to the calibration R-F transceiver 42 the two automatically locate each other via the R-F link and begin a dialogue. The computer software 40 in the calibration PC 38 will identify all of the parameters inside the tool 10 and first see if the two have ever communicated before, or if this is a new tool to the assembly factory. If they have not, the software 40 in the PC 38 will start a new record for this particular tool. This record will become part of the data in a database, such as an Access or Excel database, that records all of the calibration and service data for this tool 10 through its life. This data also becomes valuable for asset tracking because it can provide a rich history of the location of and use of a particular tool. The calibration computer software 40 will automatically create a new entry and a database record without the operator ever picking up a pencil or manually logging calibration data. This software operates this way to make it easy to introduce a new tool into a plant. Just bringing the tool into proximity of the calibration station 20 will automatically create a log of this new tool's presence in the assembly factory and store all of the information associated with that tool. Because it is probable that in very large assembly plants there may be more than one calibration station 20, the information available in these tools is intended to be stored at a central computer called a factory wide supervisor 23 typically located on a factory-wide communications network. If the calibration station 20 recognizes this tool as one previously communicated with, it will not create a new tool entry, but append data to the existing records. However, a calibration station 20 different from the one originally accessed by the tool 10 can secure the background information from the factory wide supervisor 23.

When the tool 10 runs a fastener element on the calibration device 36, the calibration device 36 automatically sends this data across the cabled serial line into the calibration PC 38. The PC 38 displays the torque values to the operator, gives the operator an opportunity to reject the torque value of a particular cycle (if there was a problem with that particular cycle), then averages the torque magnitude of multiple cycles. In one form, after the portable tool 10 runs approximately 10 cycles, the average torque of these cycles as noted by the PC 38, if at the proper magnitude, is written into the tool memory 30 by the operator via the R-F link between the tool transceiver 28 and the calibration transceiver 42. After this happens, the tool 10 is now carrying inside its memory 30 the information that identifies the magnitude of the average torque it produces to set a fastener, and this information is included in all future R-F dialogue. If the magnitude of this torque average is unacceptable, the service technician can adjust the clutch or other control apparatus in the tool 10 to raise or lower the average torque to a value closer to the desired target and run the test again until the tool 10 is set to create an average torque magnitude that is within desired tolerances.

A special enhanced version of the calibration station 20 can be used for major tool repair or reconfiguration. The enhanced version of software can be called "the tool repair station" just for differentiation purposes for this disclosure. Such a tool repair station can have all of the capabilities of the calibration station 20, but through the use of passwords and privileged access to supplemental software that will be included in the calibration station software 40 will allow the certified service technician to gain access to altering some of the parameters stored in the tool memory 30 of the tool 10. The tool repair station can facilitate repairs or reconfigurations done at the user's site at the assembly factory or an outside source other than the tool factory by specified trained technicians. Only through entering the proper pass codes will such a selected repair technician be able to gain access to all of the parameters that need to be changed when modifications are made to the tool that affect its capabilities, e.g. change to a gear ratio, addition of a gear stage that would effect direction of rotation, a revised set of software programmed into the tool 10, etc. The calibration station 20 will be linked to the factory wide supervisor 23 to provide the data necessary to keep a current and central file on all tools located within the assembly factory. If the assembly factory personnel want to start repairing these tools, then routinely this will be done by a trained or certified repair technician capable of repairing these tools. The following chart identifies those tool parameters that can be changed by the calibration station 20, and those parameters accessible solely through password enabling as would be used after a tool repair. In the chart an "N" indicates that the parameter can be changed without entering a password, a "Y" indicates that the parameter can be changed at the calibration station only if the proper password has been entered (as would be done after a tool repair).

Parameters Alterable by the Calibration Station & by the Password Enabled Calibration Station
N = No, Y = Yes

| Item | Parameter Name | Calibration Station | Tool Repair |
|---|---|---|---|
| 2 | Tool Model Number | N | Y |
| 5 | PCB Serial Number (printed circuit board) | N | Y |
| 6 | PCB Revision (printed circuit board) | N | Y |
| 7 | Tool Monitor-Controller 12 Software revision | N | Y |
| 9 | Cycle Count At Last Service Interval | Y | Y |
| 10 | Service Interval Cycles | Y | Y |
| 11 | Date Of Last Service | Y | Y |
| 12 | Service Interval Days | Y | Y |
| 13 | Cycle Count At Last Calibration | Y | Y |
| 14 | Calibration Interval Cycles | Y | Y |
| 15 | Date Of Last Calibration | Y | Y |
| 16 | Calibration Interval Days | Y | Y |

-continued

Parameters Alterable by the Calibration Station & by the Password Enabled Calibration Station
N = No, Y = Yes

| Item | Parameter Name | Calibration Station | Tool Repair |
|---|---|---|---|
| 17 | Customer Field 1 | Y | Y |
| 18 | Customer Field 2 | Y | Y |
| 19 | Customer Field 3 | Y | Y |
| 20 | Tool Max. Capacity (torque, dimension, pressure, force, etc. | N | Y |
| 21 | Engineering Units (Lb-Ft, inches, PSI, Lbs, etc.) | Y | Y |
| 22 | Tool Minimum Capacity (torque, dimension, pressure, force, etc). | N | Y |
| 23 | Spare | Y | Y |
| 24 | Tool Setting (torque, dimension, pressure, force, etc). | Y | Y |

Note:
Parameters 1, 3, 4 & 8 are not listed because they are non-field-changeable.

Now the installation tool 10 is set for setting fasteners to an appropriate torque at the selected work cell 14. When the electronics in the portable installation tool 10 is installed, the tool embedded controller 32 is set to maintain the tool 10 deactuated. Thus the tool 10 will not operate without the proper R-F actuating signal being given to the embedded controller 32, by the calibration station 20, the work cell supervisor 16 or the portable audit device 22. Typically at the work cell 14 the portable tool 10 is queried by the work cell supervisor 16. If the portable tool 10 is configured properly, and has not been used for periods that violate the company's quality policies for time and/or cycles between calibration or service periods, the tool 10 will be enabled to run by the work cell supervisor 16. This assures that a tool 10 will not operate without an R-F master station within its R-F range and will only operate if a pre-defined set of qualifications are met.

Figure 7:
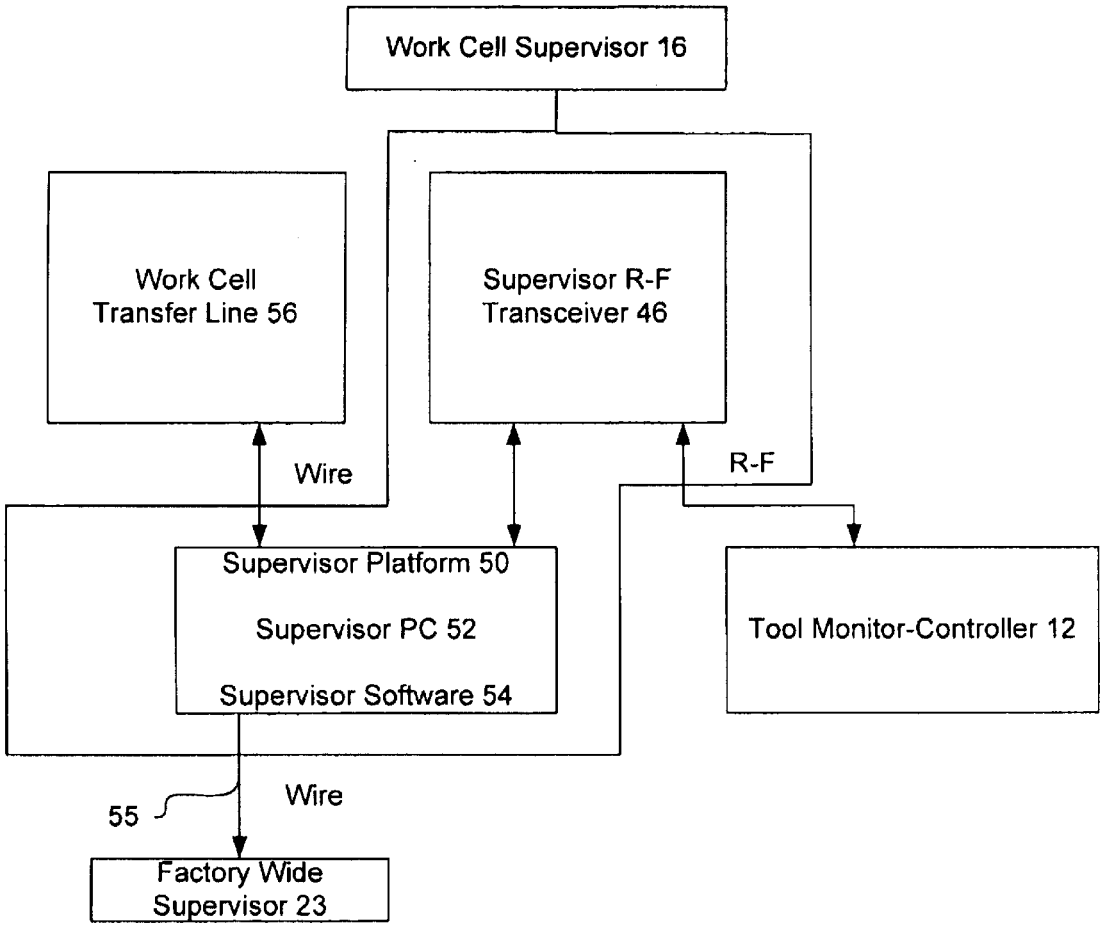
FIG. 7 is a block diagram of components of the work cell supervisor as operable with the tool monitor-controller in the work cell in which it is located; an also shows it communicable with the factory wide supervisor and a work cell transfer line.

Looking now to FIG. 7, the work cell supervisor 16 has a supervisor platform 50 with a supervisor PC 52. It can also be a single board computer. The supervisor software 54 in the supervisor PC 52 of the work cell supervisor 16 will constantly be searching for intelligent tools to link up via the R-F linkage. When the portable tool 10 is brought into the work cell 14 in proximity to the R-F range of the work cell supervisor 16 the two automatically find each other via the R-F link between the tool R-F transceiver 28 and the work cell supervisor R-F transceiver 46. They will then begin a dialogue very similar to the dialogue between the calibration station 20 and the portable tool 10. The supervisor software 54 in the work cell supervisor 16 will identify all of the parameters inside the portable tool 10 and first see if the tool 10 has been set to a torque setting that is acceptable for this particular work cell 14. If the tool 10 has the correct torque setting, the work cell supervisor 16 will then look at the acceptable limits for cycles and days between calibrations and all other criteria deemed critical for that particular work cell 14. To keep the quality of the parts being assembled high, plants will frequently have the maximum number of cycles that are allowed to be run between checking the portable tool 10 for torque accuracy set relatively low. As noted in the list of data in the tool memory 30, the tool 10 will store inside the tool memory 30 the number of cycles that were run when the tool 10 was last calibrated and last serviced and the data when the tool 10 was last calibrated and last serviced. In addition it has the maximum number of cycles and maximum number of days allowable between last calibration and servicing. This data will be monitored by the work cell supervisor 16. If the number of cycles or number of days has not been exceeded and all other criteria have been met, the work cell supervisor 16 will issue the command across the R-F link to enable the tool 10 to start operating. After the tool 10 has been enabled, the work cell supervisor 16 will constantly be monitoring the cycle count and elapsed days for calibration and service requirements and set the appropriate outputs to flag quality technicians for their attention. Maintenance and quality people will be made aware of this need for corrective action via serial messages to the factory wide supervisor 23 and visual indications at the work cell supervisor 16 and/or digital outputs from the work cell supervisor 16 indicating that there is pending or immediate need for attention.

It is common in many factories to have a centrally located factory wide supervisor 23 in which information from various work cells 14 can be monitored by quality systems supervisors. In the present invention, the work cell supervisor 16 is communicable with a factory wide supervisor 23 via a factory wide local area network. See FIGS. 1 and 7. Here the work cell supervisor platform 50 is linked to the factory wide supervisor 23 on a cabled Ethernet or an Ethernet like factory wide communications network 55. Thus initially the work cell supervisor 16 will communicate the serial number of each tool 10 in the work cell 14 to the factory wide supervisor 23 via factory wide communications network 55 whereby the location of the tools such as tool 10 can be tracked and calibration and servicing requirements audited and also tracked for asset assessment.

The work cell supervisor 16 writes new data into the tool 10 via the R-F link for "8. Total tool cycle count," and will calculate the cycle count since last service and the cycle count since last calibration based on the cycle count recorded when the tool 10 was last calibrated or serviced ("9. Cycle count at last service interval" and ("13. Cycle count at last calibration"). As noted since the tool memory 30 inside the tool 10 in some instances can be written only a limited number of times, the work cell supervisor 16 will be programmed to write new cycle count data only every 100 cycles or other selected number. In addition, at recalibration, the calibration station 20 writes new data into the tool memory 30 via the R-F link for 13. Cycle Count At Last Calibration and 15. Date Of Last Calibration.

In addition, after service with recalibration, the Calibration Station 20 will write new data into the tool memory 30 via the R-F link for 9. Cycle Count At Last Service Interval and 11. Date Of Last Service, 13. Cycle Count At Last Calibration and 15. Date Of Last Calibration.

As noted, in some embodiments the work cell supervisor 16 provides a digital output signal at a programmable percentage (e.g. 80%) of the maximum allowable cycles or elapsed time between calibrations and between last service. This signal or flag is also serially transmitted to the factory wide supervisor 23. This permits advanced arrangement for recalibration or service or for a replacement tool to be prepared for use at the work cell 14 with minimal down time of the assembly line.

After these checks have been made and the tool 10 becomes operational, a communication packet between the tool 10 and work cell supervisor 16 occurs after each fastening cycle has been successfully completed, i.e. proper torque applied to each fastener. From an assembly line point of view an assembly of particular workpieces will require the correct torque applied for a predetermined number of fastening cycles. The work cell supervisor platform 50 of the work cell supervisor 16 will be programmed to know just how many cycles are required per part being assembled for each tool 10 and provide an interface to an assembly line control via a work cell transfer line 56 to know when the pre-set number of fastening cycles has been properly performed so the parts being assembled can be released out of this work cell 14 for further processing.

Figure 3:
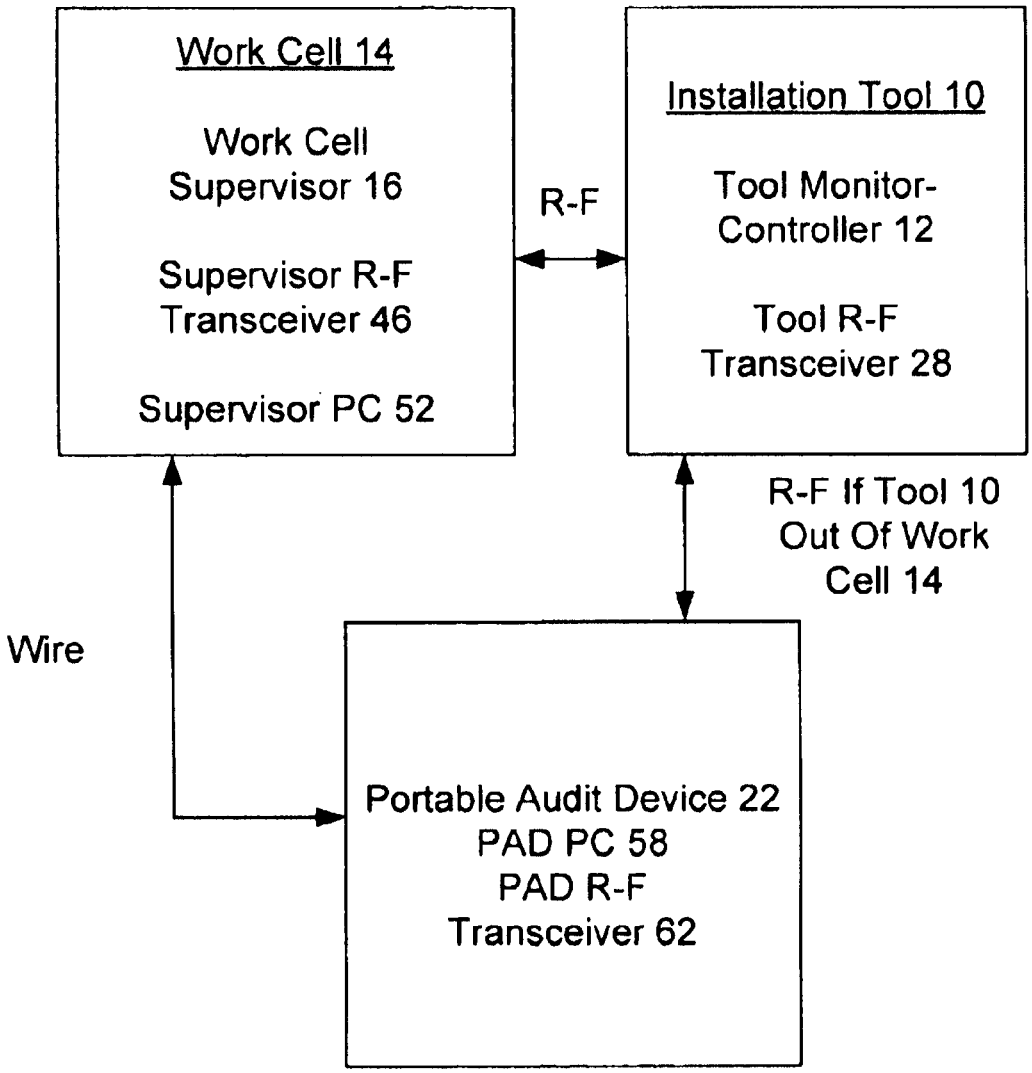
FIG. 3 is a block diagram showing a portion of the system in which the installation tool is located for operation at a work cell and is operable, remotely by communication with the work cell supervisor and can be selectively remotely, monitored by the portable audit device when it is out of the range of the work cell supervisor and at the same time the work cell supervisor can be selectively monitored by the portable audit device.

As indicated above, in some situations it would be desirable for a qualified technician to audit various portable installation tools 10 at different work cells 14 or other locations. As noted this can be done by the portable audit device 22 which can be carried by a roving inspector or tool service technician. As can be seen in FIG. 3, the portable audit device 22 has a PAD PC 58 with a PAD R-F transceiver 62 by which the audit device 22 can communicate with the tool monitor-controller 12 of the tool 10 via the tool R-F transceiver 28 if out of a work cell 14, or to the work cell supervisor 16 by cable. Although it is possible to configure the portable audit device 22 in many forms it could likely appear as a Personal Digital Assistant (PDA). Also, as noted, the provision of a PAD 22 is not necessary for the routine error proofing described.

As previously noted, the R-F transceivers can be selected from commercially available ones and as such as provided with antennas for R-F transmission and reception. However, in one form of the present invention each of the R-F transceivers 28, 42, 46 and 62 were of the same basic construction and were Bluetooth™ modules currently available as Windigo Bluetooth™ BTM0202C2XX-P[2]. In this regard, each Bluetooth™ module has a unique node address, in that every node has a guaranteed unique address identifier. Thus no two tools 10, two work cell supervisors 16, two calibration stations 20 or two portable audit devices 22 will ever repeat or respond to the same node address. This information is included inside the Bluetooth™ modules as purchased.

[2] Bluetooth is the trademark of Bluetooth SIG Inc.; these Bluetooth modules are from Windigo Systems, Inc.

When the tool 10 is initially built, it will not operate without being given permission to run either at the calibration station 20, by the work cell supervisor 16 at a work cell 14 or by a portable audit device 22. However, the tool 10 will be deactivated when it is removed from the range of the work cell supervisor 16, calibration station 20 or portable audit device 22. This assures that the tool 10 will not operate without an R-F master station within its R-F range. Since the tool 10 cannot be activated without a proper R-F signal, such as from a work cell supervisor 16, there will be little or no incentive for theft. This is also true for the portable tool activated by wire connectable to a power source since that type of tool also will not be activated without the proper R-F signal.

It should be noted, however, that with any portable tool 10 in which the electronics is battery operated, a simple mechanism, such as a manual switch or timer, could be provided to disconnect the battery or place it into a sleep mode whereby the electronics for providing the R-F signal would be deactivated resulting in increased battery life. In this regard, with portable tools having batteries with the R-F signal continuously on, a security device at the assembly factory exits could be used to detect if a portable tool 10 is being removed from the factory without permission.

Since the R-F signals from the R-F transceiver are active all of the time the units are powered up, they are always open to communicate with other Bluetooth™ based R-F transceivers. These devices have been designed to communicate specifically to other Bluetooth™ based devices due to the open interoperability, noise immunity, and international R-F frequency standardization. There are a number of embedded codes such as the node addresses and group classifications that can be used to limit the types of devices that will be permitted to communicate together. It should be noted, that the R-F transceivers require minimal energy whereby the batteries can have a long life without recharging.

The R-F link via the Bluetooth™ module as noted is available in two classes. Class 1 can transmit and receive up to 100 ft. (200 ft. dia. circle) while a class 2 can transmit and receive up to 30 ft. (60 ft. dia. circle). In one form of the invention the range was limited to class 2 to minimize possible interference between adjacent work cell supervisors 16.

Figure 9:
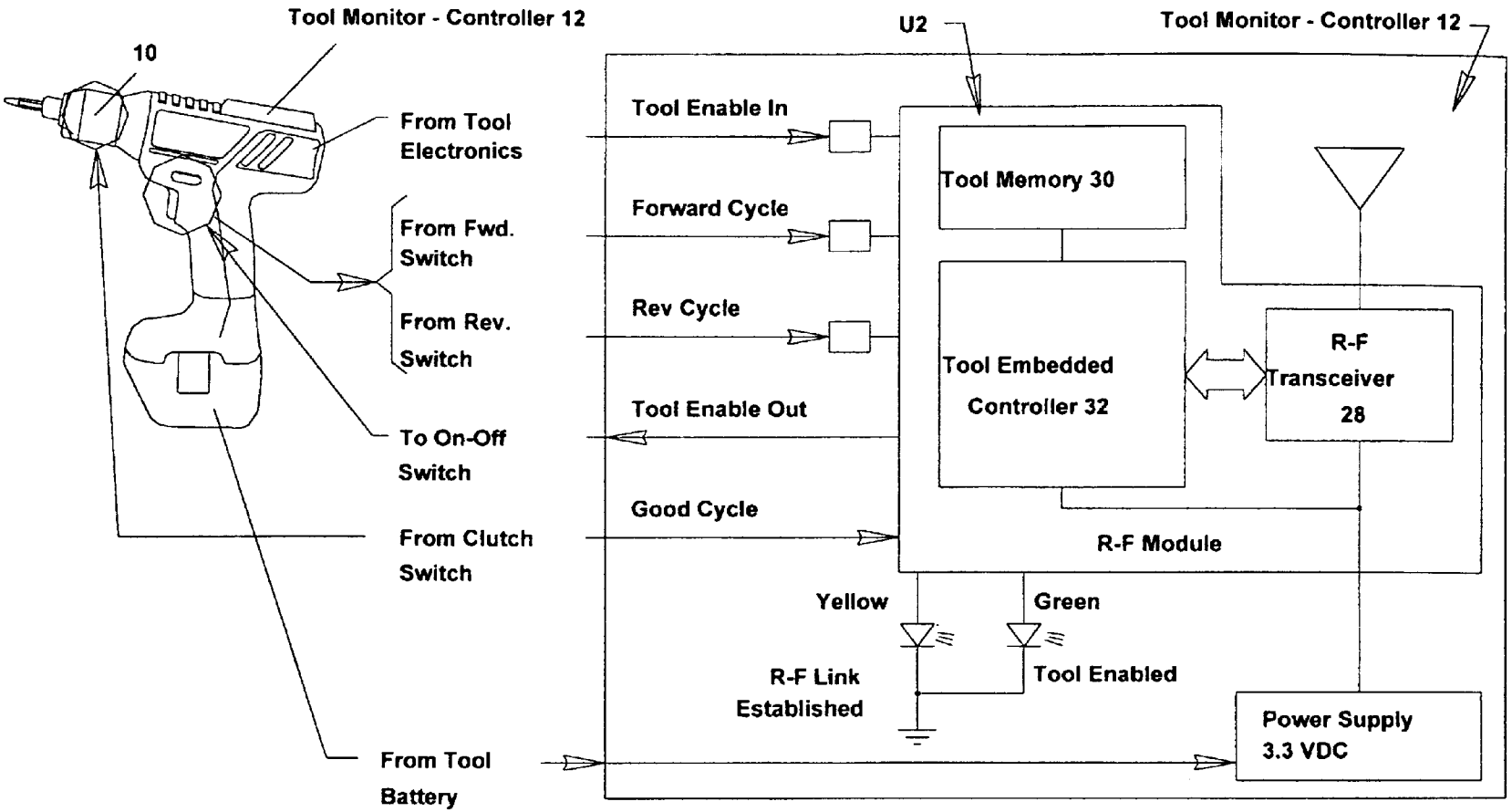
FIG. 9 is a general block diagram showing the working relationship between the tool monitor-controller and various elements of the tool to permit monitoring of the installation tool and its fastening operations.
Figure 10:
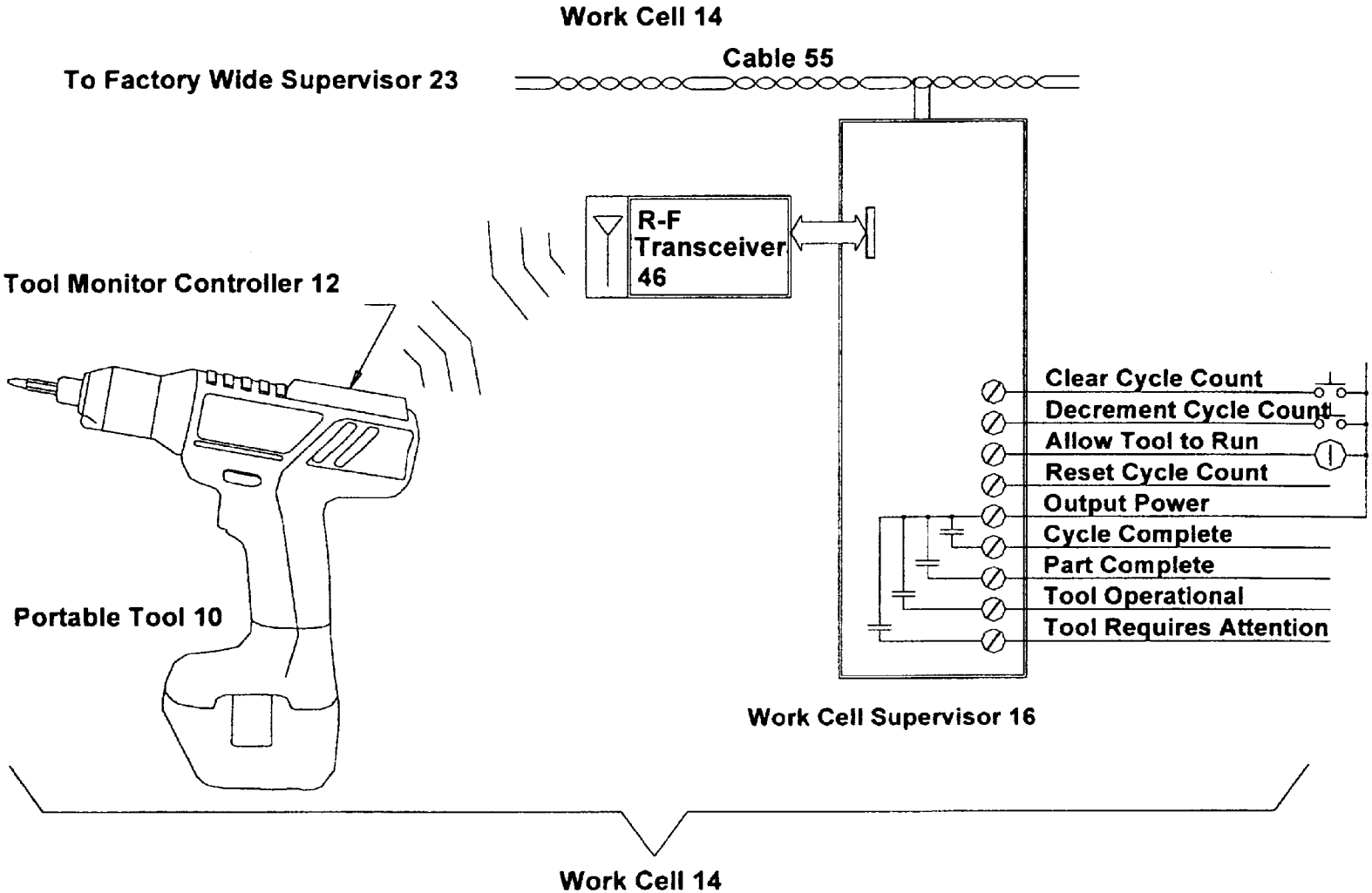
FIG. 10 is a general pictorial and block diagram showing a relationship between the work cell supervisor and a portable too.
Figure 11:
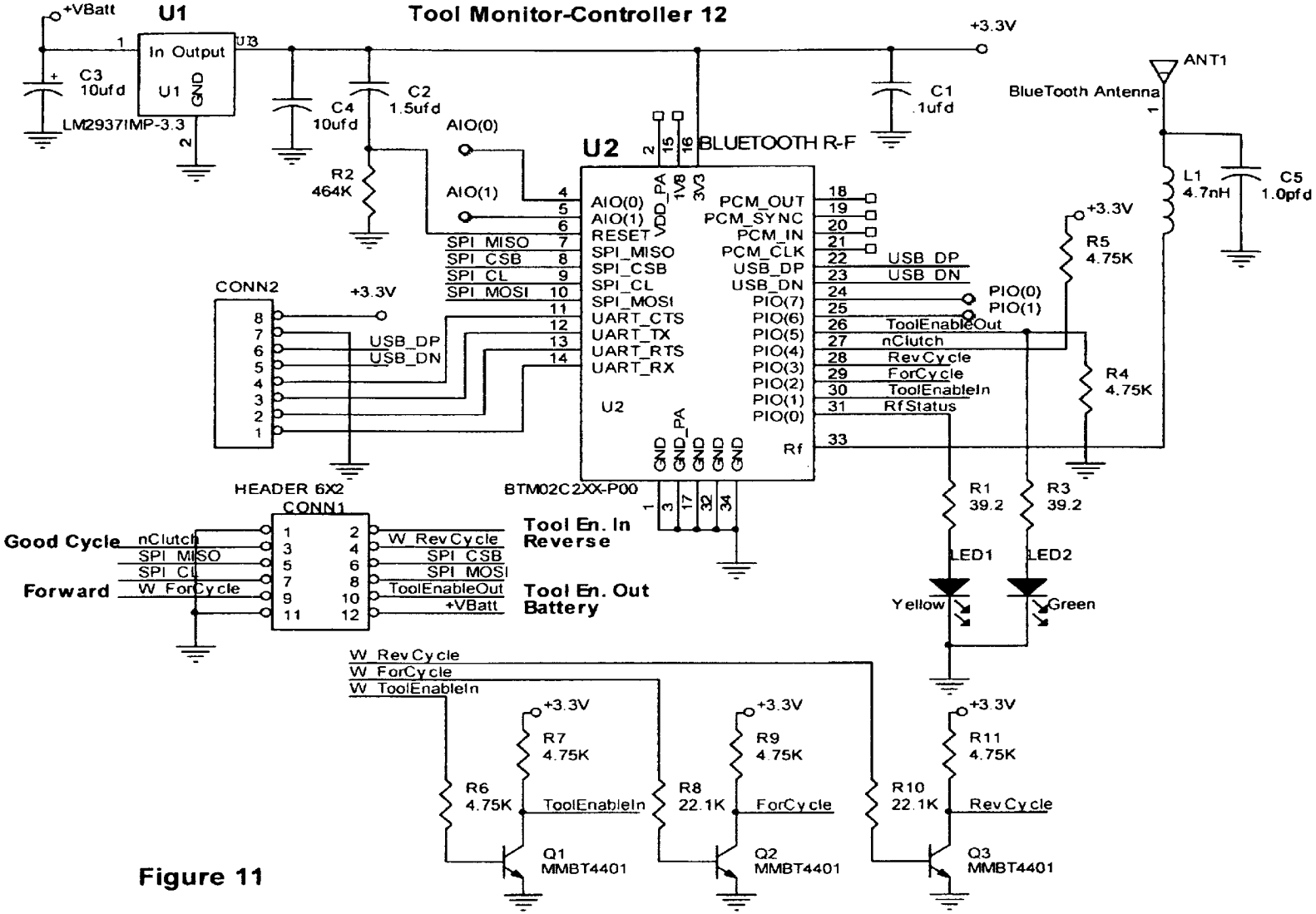
FIG. 11 is a schematic diagram of the circuitry of the tool monitor-controller for a fastening tool for monitoring by a related system.

The following discussion defines various connections between the apparatus and circuitry as shown in FIGS. 9–11. It should be understood that not all of the connections between the elements are specifically discussed since, as noted below, some of the elements are commercially available and well known to those skilled in the art. Thus all of such details are not provided for purposes of brevity and simplicity.

FIG. 11 illustrates the electrical circuits designed to interface with the switches and lights of a power tool as well as provide an R-F path for getting this information between the portable tool 10 and the work cell supervisor 16, portable audit device 22 and the calibration station 20. The Bluetooth™ module U2 requires 3.3 VDC regulated power which is generated by the base module, has I/O (input-output) lines, serial ports for communications, serial port for programming the tool memory 30, and an external antenna. All of the support for the R-F module has been placed on a second printed circuit module called the base module. The tool embedded controller 32 on the Bluetooth™ module U2 includes a processor chip which is a chip manufactured by Cambridge Silicon Radio and is programmable by SPP Master Software.

Regulated power for the R-F module is generated by a voltage regulator U1. The tool's battery power is brought through a 12 pin connector Conn1 into the voltage regulator U1. The voltage regulator U1 regulates the widely varying battery voltage to a very constant 3.3 VDC. This can allow the R-F module U2 to operate inside tools that have a wide variety of battery voltage levels. The regulator U1 will be used to eliminate the affects of battery voltage drops during high current loads and typical battery discharge from normal use. Regulator U1, located on the base module, is connected to the Windigo module U2 through one of the 34 solder tabs located around the perimeter of the Windigo module U2 that connect the Windigo R-F module U2 to the circuitry of the base module I/O (input-output) lines are brought to the base module through the connector Conn1. These I/O lines interconnect to a variety of places, a detailed description of each follows.

These connections are listed in the order of connection to connector Conn1:

Pins 1 & 11—Ground. This is the negative terminal of the tool's battery pack. It is the ground used by all of the electronics inside the tool 10.

Pin 2— W_ToolEnableIn (Tool Enable)— This is the signal produced by the electronics of the base module in the tool 10 that normally causes the tool 10 to operate. The application software executed by the CSR RISC processor takes the W_ToolEnableIn signal as a request to run the tool 10, but will not allow the tool 10 to operate unless a predetermined set of qualifications are met as determined by the WCS 16, calibration station 20, or PAD 22. These devices transmit an R-F packet into the Windigo U2 module that has a bit in it that is logically "Anded" with the W_ToolEnableIn, then converted into a physical output point ToolEnableOut. The base module effectively "intercepts" the Tool Enable command to take control of the tool 10. A pull-up resistor R7 to 3.3 VDC holds the logic level high and a transistor Q1 is used to pull the signal to a logic "0" for the Windigo Module U2. On the Windigo module U2 this line is presented to the I/O lines of the Cambridge Silicon Radio chip which is the tool embedded controller 32, which includes the state of this bit into the data transmitted via the R-F communication link.

Pin 3— nClutch (Good Cycle)— This is a signal generated by the clutch-switch that is actuated only after the tool 10 has produced the desired amount of torque, indicating a good cycle has been run. The clutch is a device that is based on a torque induced cam-over action that generated linear motion as the clutch is engaged. This linear motion is detected by a mechanical switch and this signal is presented into the base module. Because the switch provides a closure to GND (ground), the only required voltage level translation is a pull-up resistor R5 to 3.3 VDC. On the Windigo module U2 this line is presented to the I/O lines of the Cambridge Silicon Radio chip 32 (the tool embedded controller 32), which includes the state of this bit into the data transmitted via the R-F communication link.

Pin 4— W_RevCycle (Rev Cycle)— This is a signal produced at the tool's trigger switch when the switch is placed in the Reverse mode and the trigger is pulled. It is sent back to the work cell supervisor 16 when a reverse cycle has been run for whatever the end user wishes to use it for, (e.g. user may want to monitor the number of times a day an operator backed out a bolt). A pull-up resistor R11 to 3.3 VDC holds the logic level high and a transistor Q3 is used to pull the signal to a logic "0" for the Windigo Module U2. On the Windigo module U2 this line is presented to the I/O lines of the Cambridge Silicon Radio chip 32 (embedded controller 32), which includes the state of this bit into the data transmitted via the R-F communication link.

Pin 5— SPI_MISO—This is one of the wired serial lines used to program the FLASH memory 30 on the Windigo module. It stands for Synchronous Peripheral Interface—Master In, Slave Out. It passes straight through the base module and is used during the programming of the software and preset of the variables used in the Bluetooth packet protocol. Because this is all logic level, no voltage translation is required.

Pin 6 _SPI_CSB—This is one of the wired SPI serial lines used to program the FLASH memory 30 on the Windigo module U2. It stands for Synchronous Peripheral Interface—Chip Select Bit. It passes straight through the base module and is used during the programming of the software and pre-set of the variables used in the Bluetooth packet protocol. Because this is all logic level, no voltage translation is required.

Pin 7 _SPI_CL—This is one of the wired SPI serial lines used to program the FLASH memory 30 on the Windigo module U2. It stands for Synchronous Peripheral Interface—Clock. It passes straight through the base module and is used during the programming of the software and preset of the variables used in the Bluetooth packet protocol. Because this is all logic level, no voltage translation is required.

Pin 8 _SPI_MOSI—This is one of the wired SPI serial lines used to program the FLASH memory 30 on the Windigo module U2. It stands for Synchronous Peripheral Interface—Master In Out, Slave Out In. It passes straight through the base module and is used during the programming of the software and pre-set of the variables used in the Bluetooth packet protocol. Because this is all logic level, no voltage translation is required.

Pin 9—W_ForCycle (Forward Cycle)— This is a signal produced at the tool's trigger switch when the switch is placed in the Forward mode and the trigger is pulled. It just means that the tool 10 is running in a tightening mode. It is used by the application software executed by the CSR RISC processor 32 in conjunction with the clutch input to determine when a forward running cycle has been run that has caused the clutch to actuate the micro-switch. This conditioned signal constitutes an indication that a successfully run tightening cycle has been executed. This event is transmitted back to the WCS 16 to be used as a cycle counter. A pull-up resistor R9 to 3.3 VDC holds the logic level high and a transistor 02 is used to pull the signal to a logic "0" for the Windigo Module U2. On the Windigo module U2 this line is presented to the I/O lines of the Cambridge Silicon Radio chip 32, which includes the state of this bit into the data transmitted via the R-F communication link.

Pin 10— ToolEnableOut (Tool Enable). This signal is the processed version of ToolEnableIn. If the tool 10 has been enabled by the WCS 16, calibration station 20 or PAD 22 the tool 10 will be enabled by this output allowing power to flow through the trigger switch when it is pulled. This signal goes to the logic level control of the power drivers inside the trigger switch, (see FIG. 9 Tool Enable). Because this is a logic level, no voltage translation is required. This line will go to 0 VDC to disable the tool 10.

Pin 12—+VBatt. This is the positive terminal of the battery. The battery voltage will vary across the various models of portable tools, and will also fluctuate substantially during heavy loading of the electric motor inside the tool 10. This unregulated battery voltage goes to the voltage regulator U1 on the base module, then regulated DC voltage goes into the Windigo module U2.

The following lists the connections to connector CONN2 and the interaction of other elements:

Serial Port for Communications—The CSR/Windigo module supports a serial port for communication. Although the portable tool does not use these signals, they are useful when a Bluetooth link needs to be established at the work cell supervisor 16 when it is based on an IBM PC. Conn 2 pins 1–4 make up the lines required for a serial port. Conn2 pin 1 is the serial Receive (RX) of the R-F module U2; pin 2 is the Request to Send (RTS); pin 3 is the serial Transmit (TX) of the R-F module U2, and pin 4 is the signal that it is Clear to Send (CTS) messages. These lines are used in standard serial communication data links and thus are well known in the art and thus the details thereof are omitted for purposes of simplicity and brevity.

The Synchronous Peripheral Interface (SPI)— This is a wired serial port of a high speed logic level port typically used for communications between a processor and its peripheral devices. In this application the SPI port is used to download executable source code and some of the variables called persistent store into the FLASH memory 30 on the Windigo Module U2. A special programming device made by CSR called a Casira is used to generate the SPI interface. The signals involved are defined previously in Conn1 pins 5–8.

FIG. 9 shows other various interconnected elements of the system.

1. Bluetooth Antenna—Because of the infinite number of packaging constraints, Windigo has chosen to provide the R-F signal, but not the R-F antenna. This gives module users a wide variety of possibilities for antenna type and mounting locations. For the purposes of the present portable tool 10 a very small surface mounted antenna has been chosen. This antenna ANT1 is manufactured by GigaAnt corp. and is soldered directly to the base printed circuit module.

2. Yellow and Green LED—There are two light emitting diodes, a Yellow LED1 and a Green LED2 located on the base module. They have been programmed to indicate the status of the portable tool 10 regarding its ability to be used. The Yellow LED1 is used to indicate that there is radio frequency communication between the tool 10 and some other device. It is programmed to flash while the tool 10 is looking to connect to some other R-F based unit, then go to a solid lit condition once an R-F link has been established with any other Bluetooth enabled device. If the tool is removed from the work cell 14 the LED1 will flash. The Green LED2 provides an indication that the tool 10 has been enabled and is capable of running a cycle. In this regard, the circuitry of the tool 10 will activate the Green LED2 if the voltage level provided by the battery is correct for operating the tool 10. If it is not at the correct level, the LED2 will not be lit providing an alert signal to the operator and a signal to the work cell supervisor 16 that the tool 10 cannot be actuated by R-F communication.

Looking to FIG. 10, circuits for the work cell supervisor 16 are shown.

The Inputs and Outputs of the Work Cell Supervisor 16 include: Clear Cycle Count—This input resets the Cycle Count to zero.

The Cycle Count is the number of "good" cycles performed on a particular part being assembled (e.g. car) at the work cell 14. The work cell supervisor 16 will keep track of the number of times a tool 10 has been run to good torque and (optionally) disable the tool 10 when it has reached the predetermined number of cycles for that assembly. If, for example a dashboard were being fastened into a car and there were twelve fasteners required to secure it in place, the work cell supervisor 16 will keep the running count of good fastening operations and when twelve fasteners are applied the work cell supervisor 16 will (optionally) disable the tool 10. This becomes a checks and balances for the assembly technician. If the assembly technician is attempting to tighten fasteners on the next scheduled car before the assembly line control equipment acknowledges the old car cleared out and the new car to be in position, the tool 10 will be maintained disabled. This prevents "walk ahead" where an assembly line technician using a portable tool starts working on a new car before it is logged in at the designated work cell area 14.

In an enhanced and optional mode, the work cell supervisor 16 will enable the tool monitor-controller 12 to permit the tool 10 to run a pre-determined number of good cycles, then must make the tool 10 inoperable. This is done in instances where the integrity of the R-F link is diminished due to temporary radio frequency interference or a need to temporarily operate a tool 10 over distances greater than the R-F link will allow. As in the example above where elements are to be fastened into a car and a selected number of fasteners are required to secure ti in place, the work cell supervisor 16 will enable the tool monitor-controller 12 to keep the running count of good fastening cycles and when the selected number of fasteners have been applied, to disable the tool 10 and, when R-F communication is reestablished to then inform the work cell supervisor 16 that all of the required cycles have been run and to allow the work cell supervisor 16 to initiate the same outputs it would to the work cell transfer line 56 as it would during normal operation. This feature allows the tool 10 to leave the direct communication with the R-F link only for a predetermined number of cycles before the tool 10 is disabled by the tool monitor-controller 12. Typical examples of how this feature would be used are in applications such as deep inside a trunk, glove box, or behind the instrument panel where it is possible to intermittently lose the R-F link. This allows the tool 10 to be run independently of the work cell supervisor 16 just long enough without the direct contact with the R-F link to complete the assembly of a single car. When the assembly technician leaves the car and is walking to the next vehicle, the R-F link between the work cell supervisor 16 and the tool monitor-controller 12 will become reestablished and, if the correct number of good cycles are noted, the counter will be reset in the tool 10 enabling the tool 10 to run the appropriate number of cycles required for the next vehicle.

Asserting the Clear Cycle Count—This will reset the cycle counter to zero and will re-enable the tool 10 to run if it had been previously stopped because it had reached terminal Cycle Count. This input will typically be generated by the operator at a small operator station with a momentary push-button switch.

Decrement Cycle Count—Assertion of this input will cause the cycle counter to be decremented by one (unless the count is at zero). This input can be used by a technician when the Cycle Counter is incremented inaccurately, as in the case where an operator tightened the same fastener to an acceptable torque level twice (often called a double hit). Another situation is where there is cross threading between the fastener elements but the acceptable torque level is still reached. This decrement input will typically be generated by the operator at a small operator station with a momentary pushbutton switch to reduce the cycle count.

Allow Tool to Run—Assertion of this input will cause the work cell supervisor 16 to send permission for the tool 10 to run regardless of any of the cycle count, cycles since calibration, torque calibration, etc. test results. This should be a highly secured input switch that is accessible only by a special key. The purpose of this input is to allow the tools to resort to their native state where human supervision is the only check to assure the tools are operating correctly. This mode is typically used, for example, when building a prototype assembly. A tool 10 is needed to be used for some function other than its normal purpose, the assembly line tracking logic is inoperable, or other unforeseen circumstances. The tool 10 will still not operate unless it is located inside the work cell 14 or near a PAD 22 or calibration station 20 where it is receiving the Bluetooth R-F command to run.

Reset Cycle Count—Functionally the same as the Clear Cycle Count, but sourced from a different place. The assembly line operator needs a pushbutton (Clear Cycle Count) to reset everything in the event the operator somehow gets things out of synchronization, but in addition, when everything is running properly the operator should not have to do anything to maintain assembly line flow other than run the pre-prescribed assembly routine. The line tracking equipment should be set up to advance a new (car) into the work cell 14 and reset the cycle counter by asserting the Reset Cycle Counter automatically. This typically comes from a programmable Logic Controller (PLC) that is controlling assembly line flow. When a new vehicle enters the work cell 14, the line controlling PLC will assert the Reset Cycle Counter for a brief time; the cycle counter will be reset to zero, and the tool 10 will be enabled to run.

Output Power—This is the voltage used to drive digital inputs and outputs for the work cell supervisor 16. In some cases it is typically 24 VDC.

Cycle Complete—This is a signal that indicates that a good fastening cycle has just been completed. It is not often used in automated assembly lines, but is available to drive an output (into a PLC), or an indicator light.

Part Complete—This output goes active when the required number of good cycles have been performed on a particular part. This typically is wired into the assembly line controlling PLC so it can know when to advance the assembly line. The Part Complete output from the work cell supervisor 16 will typically trigger the assembly line controlling PLC to generate the Reset Cycle Count input into the work cell supervisor 16.

Tool Operational—This output from the work cell supervisor 16 that indicates the tool 10 is fully operational and capable of running fastening cycles. A lack of this signal will most likely trigger a requirement for a service technician to determine what has caused this tool 10 to become non-operational. Typical causes for this signal to go false are: The tool 10 is not adjusted to the proper torque for this application, the tool 10 has been run too many cycles and has not been calibrated as required, the R-F link between the tool 10 and the work cell supervisor 16 is not operating, etc.

Tool Requires Attention—This output is a warning that a condition exists that will immanently shut down a tool 10. This will occur when a tool 10 has been run too many cycles without being re-certified.

It can be seen that the present system provides a wide variety of monitors and control features which can be selectively varied for numerous application. Thus the description of the invention is merely exemplary in nature and, thus, variations that do not depart from the gist of the invention are intended to be within the scope of the invention. Such variations are not to be regarded as a departure from the spirit and scope of the invention.

What is claimed is:

1. An error proofing system for portable tools comprising:

a portable, electrically operated tool for applying torque to set a [threaded] fastener on a workpiece at a work cell, said tool having a tool monitor-controller operable for controlling the operation of said tool, said tool being pre-set to provide an output torque of a desired magnitude, said tool monitor-controller having a radio frequency tool transceiver for communication with selected devices, one of said devices being a work cell supervisor located at the work cell to monitor and control said tool, said work cell supervisor having a radio frequency supervisor transceiver for communicating with said tool through said tool transceiver when said tool is in the work cell, said tool having a torque sensor for sensing the magnitude of torque applied to each [threaded] fastener [in installation and with the torque magnitude noted in said tool monitor-controller], said tool providing a torque signal to said work cell supervisor by radio frequency communication between said tool transceiver and said supervisor transceiver [when the applied torque of the desired magnitude is reached in setting the threaded fastener whereby the work cell supervisor can count the number of proper installation torque cycles], *where the torque signal is indicative of the sensed magnitude of torque applied to a given fastener,* said tool monitor-controller having preset information regarding the desired magnitude of setting torque on said tool [and other information as to certain parameters necessary for said tool to be actuated], said work cell supervisor being preset as to the desired magnitude of setting torque [and other information necessary] for said tool to be activated and if such information is correct said work cell supervisor will then provide a signal to said monitor-controller by communication between said tool transceiver and said supervisor transceiver to permit said tool to be activated for installing fasteners in the work cell but if the desired magnitude of setting torque is not correct [or one of the other parameters is not correct] then said tool will not be activated by said work cell supervisor.

2. The error proofing system of claim 1 with said work cell supervisor having a preselected number of torque cycles of desired magnitude required to be produced by the tool on the work piece at the work cell, said work cell supervisor keeping count of the number of correct torque cycle signals received from said tool monitor-controller of said tool, if the number of correct torque cycle signals of desired magnitude is attained then said work cell supervisor will permit the workpiece to be transferred from the work cell, if the number is not attained then said work cell supervisor will provide a signal whereby the workpiece can be checked.

3. The error proofing system of claim 1 with said portable electrically actuated tool being battery operated.

4. The error proofing system of claim 1 wherein said portable electrically actuated tool being powered by connection of an electric cord to a power source at the work cell and including a battery in the tool for energizing said monitor-controller for continuous radio frequency communication by said tool transceiver and with transceivers on other apparatus.

5. The error proofing system of claim 1 with said other parameters including information regarding preselected intervals for recalibration.

6. The error proofing system of claim 1 with said other parameters including information regarding preselected intervals for servicing.

7. The error proofing system of claim 1 with said other parameters including information regarding a preselected number of cycles of installed fasteners for calibration.

8. The error proofing system of claim 1 with said other parameters including information regarding preselected number of cycles of installed fasteners for servicing.

9. The error proofing system of claim 1 with said other parameters including information regarding a preselected number of elapsed days for recalibration.

10. The error proofing system of claim 1 with said other parameters including information regarding preselected number of elapsed days for servicing.

11. The error proofing system of claim 1 with said devices including a portable audit device having a radio frequency transceiver for communicating with said tool through said tool transceiver for monitoring certain information in said tool monitor-controller.

12. The error proofing system of claim 1 with said tool monitor-controller having preset information as to certain parameters which cannot be changed by the end user or in the field and includes at least one of the following: tool type, tool serial number or tool build date.

13. The error proofing system of claim 1 including a calibration station for calibrating said tool to said desired magnitude of output torque and having a radio frequency calibration transceiver for communicating with said tool monitor-controller through said radio frequency tool transceiver for providing said tool monitor-controller with said preset information regarding said magnitude of setting torque as set at said calibration station.

14. The error proofing system of claim 1 with said tool monitor-controller including a printed circuit board and software and including restricted access means requiring a preselected password for changing information in said tool monitor-controller relating to one or more of revision to said printed circuit board or circuit board serial number, software revision, tool maximum capacity or tool minimum capacity.

15. The error proofing system of claim 1 including a calibration station for calibrating said tool to said desired magnitude of output torque and having a radio frequency calibration transceiver for communicating with said tool monitor-controller through said radio frequency tool transceiver for providing said tool monitor-controller with said preset information regarding said magnitude of setting torque as set at said calibration station, said tool monitor-controller including a printed circuit board and software and with said calibration station including restricted access means requiring a preselected password for changing information in said tool monitor-controller relating to one or more of revisions to said printed circuit board or circuit board serial number, software revision, tool maximum capacity or tool minimum capacity.

16. The error proofing system of claim 1 with said tool monitor-controller including at least one open memory location to permit the end user to insert selected information in such memory location.

17. The error proofing system of claim 1 with said work cell supervisor having means selectively operable by an operator for resetting the recorded cycle count of the number of correct torque magnitude to zero.

18. The error proofing system of claim 1 with said work cell supervisor having means selectively operable by an operator for incrementally reducing the recorded cycle count of the number of cycles of correct magnitude.

19. The error proofing system of claim 1 with said work cell supervisor including control means selectively actuable by an operator to permit said tool to be operated substantially without restriction within said work cell but with said control means including restricted access means to selectively limit access to said control means.

20. The error proofing system of claim 1 with said devices including a portable audit device having a radio frequency transceiver for communicating with said tool through said tool transceiver for monitoring certain information in said tool monitor-controller, such communication occurring outside of the range of said supervisor transceiver.

21. The error proofing system of claim 1 with said other information in said tool monitor-controller as to certain parameters including information as to the make and/or model number of said tool, said work cell supervisor being preset as to information as to the desired make and/or model umber of said tool to be operable at the work cell and if such information from said tool monitor-controller is not correct then said tool will not be actuated by said work cell supervisor.

22. The error proofing system of claim 1 with said tool monitor-controller having a memory for numerous fields including total tool cycle count, data as to last service and last calibration, said work cell supervisor recording the total number of cycles performed by said tool while in the work cell and periodically updating the total tool cycle count in a memory of said tool monitor-controller after a preselected number of cycles.

23. The error proofing system of claim 1 with said other parameters including information regarding identification of said tool, information for periodic servicing of said tool, and information for periodic calibration of said tool.

24. The error proofing system of claim 23 with said noted information being accessible by said work cell supervisor by radio frequency communication.

25. The error proofing system of claim 23 including a calibration station for calibrating said tool to said desired magnitude of output torque and having a radio frequency calibration transceiver for communicating with said tool monitor-controller through said radio frequency tool transceiver for providing said tool monitor-controller with said preset information regarding said magnitude of setting torque as set at said calibration station and with said noted information being accessible by said calibration station by radio frequency communication.

26. An error proofing system for portable tools comprising:

a portable, electrically operated tool for applying torque to set a threaded fastener on a workpiece at a work cell, said tool having a tool monitor-controller operable for controlling the operation of said tool, said tool being pre-set to provide an output torque of a desired magnitude, said tool monitor-controller having a radio frequency tool transceiver for communication, a work cell supervisor located at the work cell to monitor and control said tool and having a radio frequency supervisor transceiver for communicating with said tool through said tool transceiver when said tool is in the work cell, said tool having a torque sensor for sensing the magnitude of torque applied to each threaded fastener in installation and with the torque magnitude noted in said tool monitor-controller, said tool providing a torque signal to said work cell supervisor by radio frequency communication between said tool transceiver and said supervisor transceiver when the applied torque of the desired magnitude is reached in setting the threaded fastener whereby the work cell supervisor can count the number of proper installation torque cycles, said tool monitor-controller having preset information regarding the desired magnitude of setting torque on said tool, said work cell supervisor being preset as to the desired magnitude of setting torque for said tool to be activated and if such information is correct said work cell supervisor will then provide a signal to said monitor-controller by communication between said tool transceiver and said supervisor transceiver to permit said tool to be activated for installing fasteners in the work cell but if the desired magnitude of setting torque is not correct then said tool will not be activated by said work cell supervisor.

27. The error proofing system of claim 26 with said work cell supervisor having a preselected number of torque cycles of desired magnitude required to be produced by the tool on the work piece at the work cell, said work cell supervisor keeping count of the number of correct torque cycle signals received from said tool monitor-controller of said tool, if the number of correct torque cycle signals of desired magnitude is attained then said work cell supervisor will permit the workpiece to be transferred from the work cell, if the number is not attained then said work cell supervisor will provide a signal whereby the workpiece can be checked.

28. The error proofing system of claim 26 with said portable electrically actuated tool being battery operated.

29. The error proofing system of claim 26 with said portable electrically actuated tool being powered by connection of an electric cord to a power source at the work cell and including a battery in the tool for energizing said monitor-controller for continuous radio frequency communication by said tool transceiver with transceivers on other apparatus.

30. The error proofing system of claim 26 with said tool monitor-controller including information regarding preselected intervals for recalibration, said work cell supervisor receiving such information and providing a signal to alert for recalibration by or at the selected interval.

31. The error proofing system of claim 26 with said tool monitor-controller including information regarding preselected intervals for servicing, said work cell supervisor receiving such information and providing a signal to alert for servicing by or at the selected interval.

32. The error proofing system of claim 26 with said tool monitor-controller including information regarding a preselected number of cycles of installed fasteners for recalibration, said work cell supervisor receiving such information and providing a signal to alert for recalibration by or at the preselected number of cycles.

33. The error proofing system of claim 26 with said tool monitor-controller including information regarding a preselected number of cycles of installed fasteners for servicing, said work cell supervisor receiving such information and providing a signal to alert for servicing by or at the preselected number of cycles.

34. The error proofing system of claim 26 with said tool monitor-controller including information regarding a preselected number of elapsed days for recalibration, said work cell supervisor receiving such information and providing a signal to alert for recalibration by or at the preselected number of elapsed days.

35. The error proofing system of claim 26 with said tool monitor-controller including information regarding a preselected number of elapsed days for servicing, said work cell supervisor receiving such information and providing a signal to alert for servicing by or at the preselected number of elapsed days.

36. The error proofing system of claim 26 with said devices including a portable audit device having a radio frequency transceiver for communicating with said tool through said tool transceiver for monitoring certain information in said tool monitor-controller, such communication occurring outside of the range of said supervisor transceiver.

37. The error proofing system of claim 26 with said tool monitor-controller having preset conformation as to other parameters including information regarding identification of said tool, information for periodic servicing of said tool, and information for periodic calibration of said tool.

38. The error proofing system of claim 37 with said noted information being accessible by said work cell supervisor by radio frequency communication.

39. The error proofing system of claim 37 including a calibration station for calibrating said tool to said desired magnitude of output torque and having a radio frequency calibration transceiver for communicating with said tool monitor-controller through said radio frequency tool transceiver for providing said tool monitor-controller with said preset information regarding said magnitude of setting torque as set at said calibration station and with said noted information being accessible by said calibration station by radio frequency communication.

40. An error proofing system for portable tools comprising:

a portable, electrically operated tool for applying torque to set a threaded fastener on a workpiece at a work cell, said tool having a tool monitor-controller operable for controlling the operation of said tool, said tool being pre-set to provide an output torque of a desired magnitude, said tool monitor-controller having a radio frequency tool transceiver for communication, a work cell supervisor located at the work cell to monitor and control said tool and having a radio frequency supervisor transceiver for communicating with said tool through said tool transceiver when said tool is in the work cell, said tool having a torque sensor for sensing the magnitude of torque applied to each threaded fastener in installation and with the torque magnitude noted in said tool monitor-controller, said tool monitor-controller having preset information regarding the desired magnitude of setting torque on said tool, said work cell supervisor being preset as to the desired magnitude of setting torque for said tool to be activated and if the magnitude of setting torque is correct said work cell supervisor will then provide a signal to said monitor-controller by communication between said tool transceiver and said supervisor transceiver to permit said tool to be activated for installing fasteners in the work cell but if the desired magnitude of setting torque is not correct then said tool will not be activated by said work cell supervisor.

41. The error proofing system of claim 40 with said portable tool being activated only when in the radio frequency range of said work cell supervisor or other device having a radio frequency transceiver communicable with said radio frequency tool transceiver to selectively provide a signal activating said portable tool, said portable tool being deactivated and not otherwise actuable when out of the range of said radio frequency transceivers of said work cell supervisor or other of said devices whereby theft of said portable tool is inhibited.

42. The error proofing system of claim 41 with said radio frequency of said tool being continuously actuated to provide the radio frequency signal whereby a monitor at the location of said portable tool can detect the presence of said tool at exit areas whereby theft of said portable tool is inhibited.

43. An error proofing system for portable tools comprising:

a portable tool for performing a preselected task on a workpiece at a work cell, said tool having a tool monitor-controller operable for controlling the operation of said tool, said tool being pre-set to provide the task at a desired magnitude, said tool monitor-controller having a radio frequency tool transceiver for communication with selected devices, one of said devices being a work cell supervisor located at the work cell to monitor and control said tool, said work cell supervisor having a radio frequency supervisor transceiver for communicating with said tool through said tool transceiver when said tool is in the work cell, said tool having a sensor for sensing the magnitude of the task applied to the workpiece, said tool providing a task magnitude signal to said work cell supervisor by radio frequency communication between said tool transceiver and said supervisor transceiver when the applied task of the desired magnitude is reached whereby the work cell supervisor can monitor the operation of said tool, said tool monitor-controller having preset information regarding the desired magnitude of the setting of the task on said tool and other information as to certain parameters necessary for said tool to be actuated, said work cell supervisor being preset as to the desired magnitude of the task and other information necessary for said tool to be activated and if such information is correct said work cell supervisor will then provide a signal to said monitor-controller by communication between said tool transceiver and said supervisor transceiver to permit said tool to be activated to perform task in the work cell but if the desired magnitude of the task is not correct or one of the other parameters is not correct then a signal will be generated whereby said tool should not be activated.

44. An error proofing system for portable tools comprising:

a portable, electrically operated tool for applying torque to set a threaded fastener on a workpiece at a work cell, said tool having a tool monitor-controller operable for controlling the operation of said tool, said tool being pre-set to provide an output torque of a desired magnitude, said tool monitor-controller having a radio frequency tool transceiver for communication, a work cell supervisor located at the work cell to monitor and control said tool and having a radio frequency supervisor transceiver for communicating with said tool through said tool transceiver when said tool is in the work cell, said tool having a torque sensor for sensing the magnitude of torque applied to each threaded fastener in installation and with the torque magnitude noted in said tool monitor-controller, said tool providing a torque signal to said work cell supervisor by radio frequency communication between said tool transceiver and said supervisor transceiver when the applied torque of the desired magnitude is reached in setting the threaded fastener whereby the work cell supervisor can count the number of proper installation torque cycles, said tool monitor-controller having preset information regarding the desired magnitude of setting torque on said tool, said work cell supervisor being preset as to the desired magnitude of setting torque for said tool to be activated and if such information is correct said work cell supervisor will then provide a signal to said monitor-controller by communication between said tool transceiver and said supervisor transceiver to permit said tool to be activated for installing fasteners in the work cell but if the desired magnitude of setting torque is not correct then said tool will not be activated by said work cell supervisor, said work cell supervisor capable of activating said tool by R-F communication with said tool monitor-controller to permit said tool to be activated to install fasteners outside of the R-F range of said supervisor transceiver for a preselected interval.

45. The error proofing system of claim 44 with said preselected interval when said tool is activated to install fasteners outside of the R-F range of said supervisor transceiver being a preselected number of cycles of applied torque of the desired magnitude as counted by said tool monitor-controller.

*46. A method comprising:*

*providing a tool having a tool monitor controller, the tool monitor controller having a first memory and a tool transceiver;*

*presetting the tool such that a magnitude of an output of the tool is within a predetermined first set point range;*

*loading a first set of data into the first memory, the first set of data including the magnitude of the output of the tool;*

*providing a work cell supervisor having a supervisor transceiver;*

*establishing wireless communication between the tool transceiver and the supervisor transceiver wherein the tool transceiver communicates the magnitude of the output of the tool to the supervisor transceiver;*

*transmitting a command from the supervisor transceiver to the tool transceiver to wirelessly activate the tool if the magnitude of the output of the tool is within a predetermined second set point range, wherein activation of the tool permits the tool to be employed for a predetermined number of tool operation cycles prior to requiring reactivation.*

*47. The method of claim 46, wherein the tool transceiver and the supervisor transceiver are radio frequency transceivers.*

* * * * *